United States Patent [19]

Hashimoto et al.

[11] Patent Number: 5,274,506
[45] Date of Patent: Dec. 28, 1993

[54] VIDEO RECORDING AND PLAYBACK DEVICE WITH BUILT-IN VIDEO CAMERA IN AN OUTER CASE COMPATIBLE WITH EXISTING TAPE CASSETTE

[75] Inventors: Naoki Hashimoto; Shuzo Takeda, both of Osaka; Kiyotsugu Hayashi, Kyoto; Hideaki Yoshio, Osaka; Nobuaki Takagi, Osaka; Keisuke Ito, Osaka; Akio Konishi, Osaka, all of Japan

[73] Assignee: Matsushita Electric Industrial Co., Ltd., Osaka, Japan

[21] Appl. No.: 452,482

[22] Filed: Dec. 19, 1989

[30] Foreign Application Priority Data

Dec. 19, 1988 [JP] Japan .................. 63-319751
Dec. 19, 1988 [JP] Japan .................. 63-319752

[51] Int. Cl.⁵ .................. H04N 5/78; G11B 23/02
[52] U.S. Cl. .................. 360/33.1; 360/132; 360/137; 358/335
[58] Field of Search .................. 360/33.1, 85, 95, 84, 360/132, 35.1; 242/199, 198; 358/906, 342, 335

[56] References Cited

U.S. PATENT DOCUMENTS 4,057,830 11/1977 Adcock .................. 358/906
4,631,615 12/1986 Grossman et al. .................. 360/128

OTHER PUBLICATIONS

Development of an extremely small video tape recorder by Matsumoto et al. from IEEE Transactions in Consumer Electronics vol. CE-27 No. 3 Aug. 1981 pp. 331-339.

Primary Examiner—Aristotelis Psitos
Assistant Examiner—Varsha V. Sheladia
Attorney, Agent, or Firm—Lowe, Price, LeBlanc & Becker

[57] ABSTRACT

A video recording and playback device with a built-in video camera includes an outer case having the same profile as that of a tape cassette that can be inserted into an exiting stationary video tape recorder. The outer case houses a pair of rotatable reels, a magnetic tape wound around the reels, a magnetic head drum for recording signals on the magnetic tape, magnetic tape guide posts for guiding the magnetic tape to run on and around the magnetic head drum a magnetic tape transport unit for transporting the magnetic tape from one of the reels to the other reel, an imaging unit for producing a video signal representative of an image of an object, a signal recording circuit for processing the video signal from the imaging unit and enabling the magnetic head drum to record the video signal on the magnetic tape, and a power receiving terminal assembly for receiving electric power to energize the motor of the magnetic head drum, the magnetic tape transport unit, the imaging unit, and the signal recording circuit. A recording medium such as a magnetic sheet disk or an optical disk may be employed instead of the magnetic tape.

35 Claims, 27 Drawing Sheets

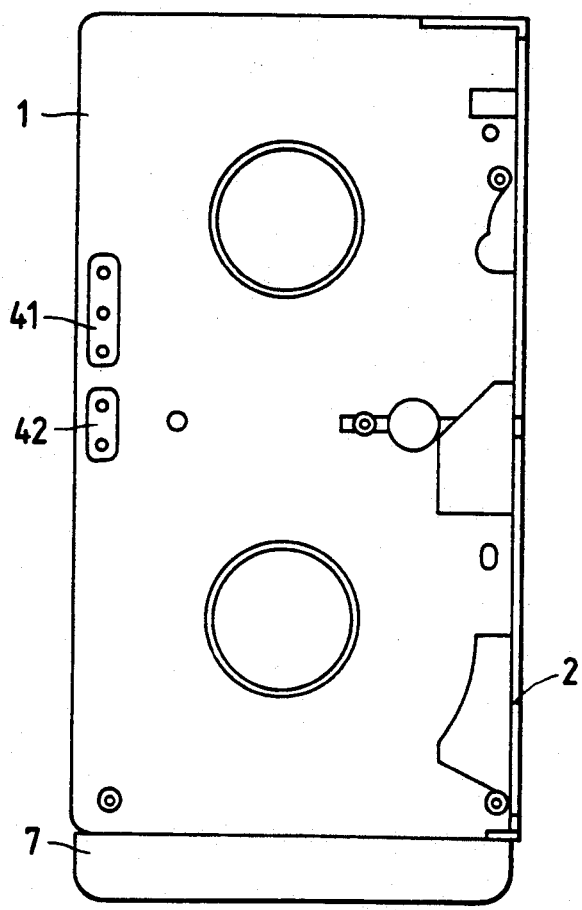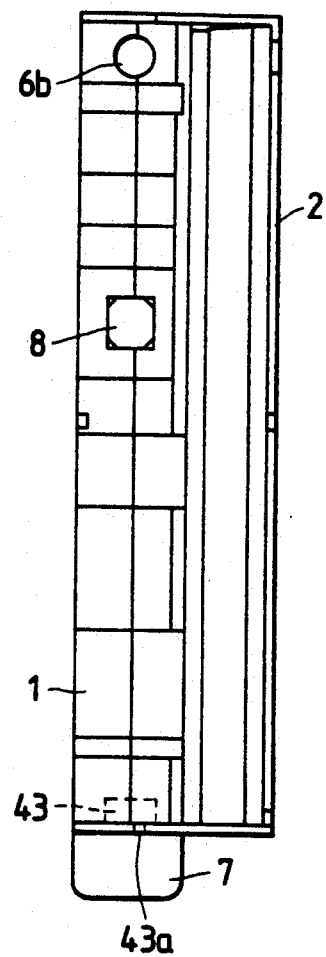

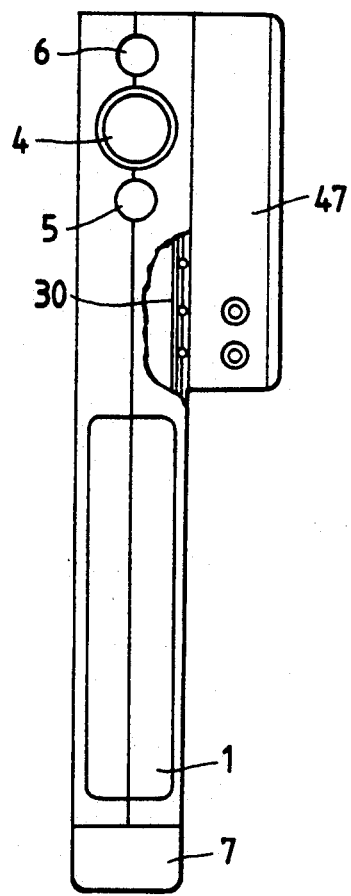
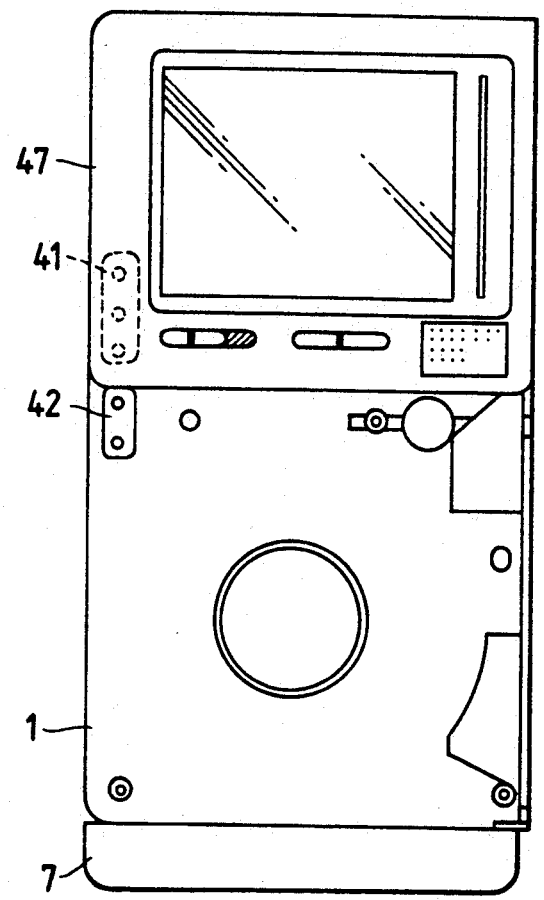
FIG. 23
FIG. 24

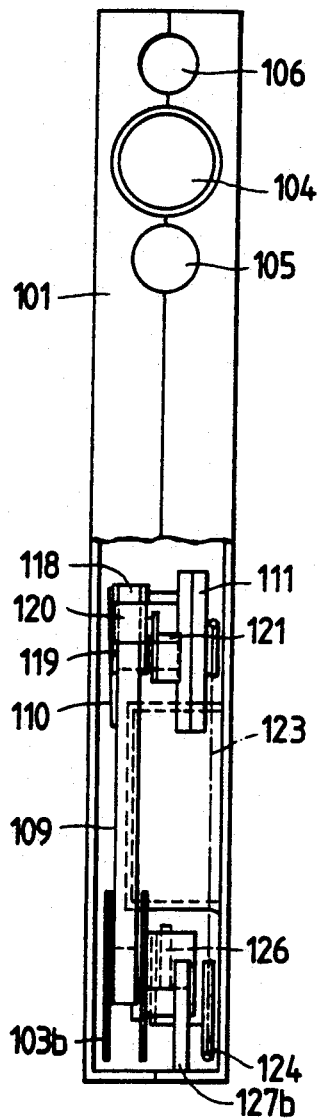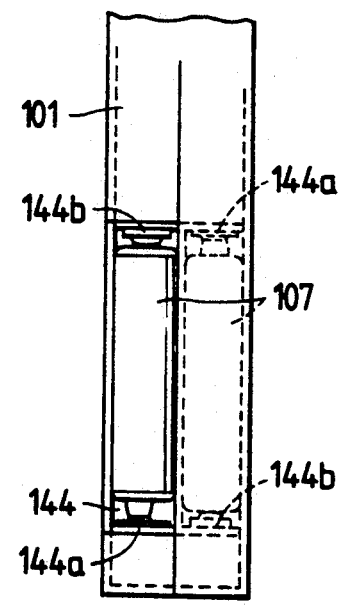

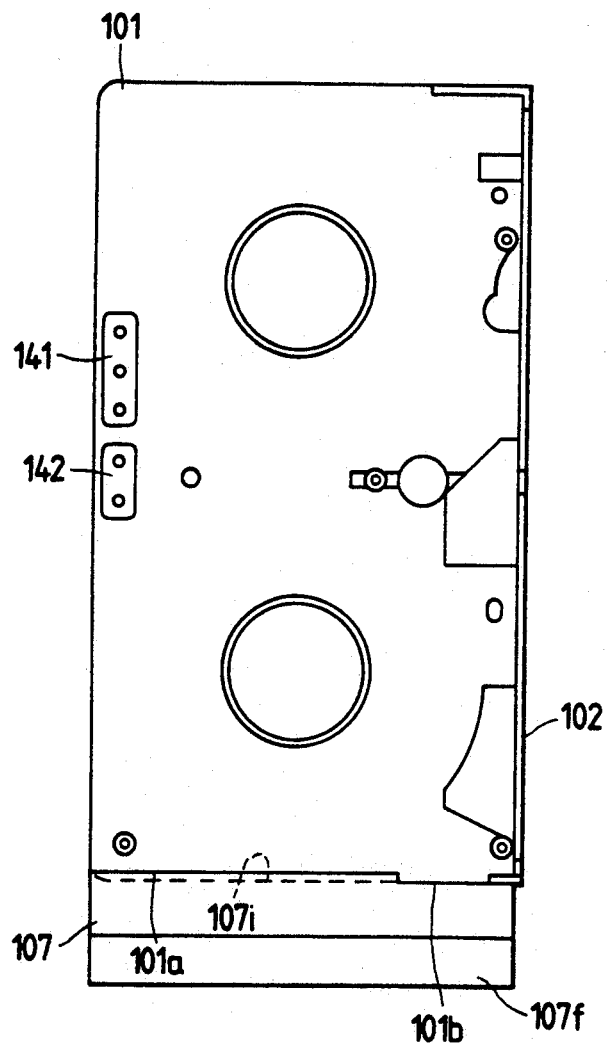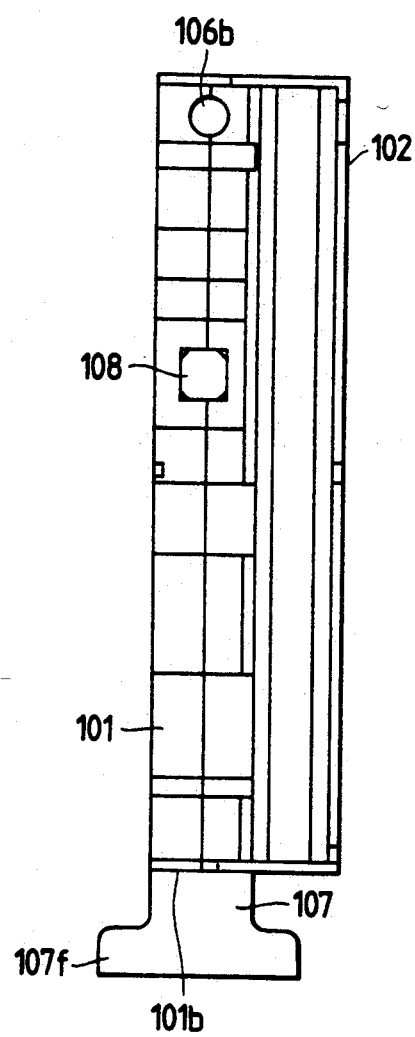

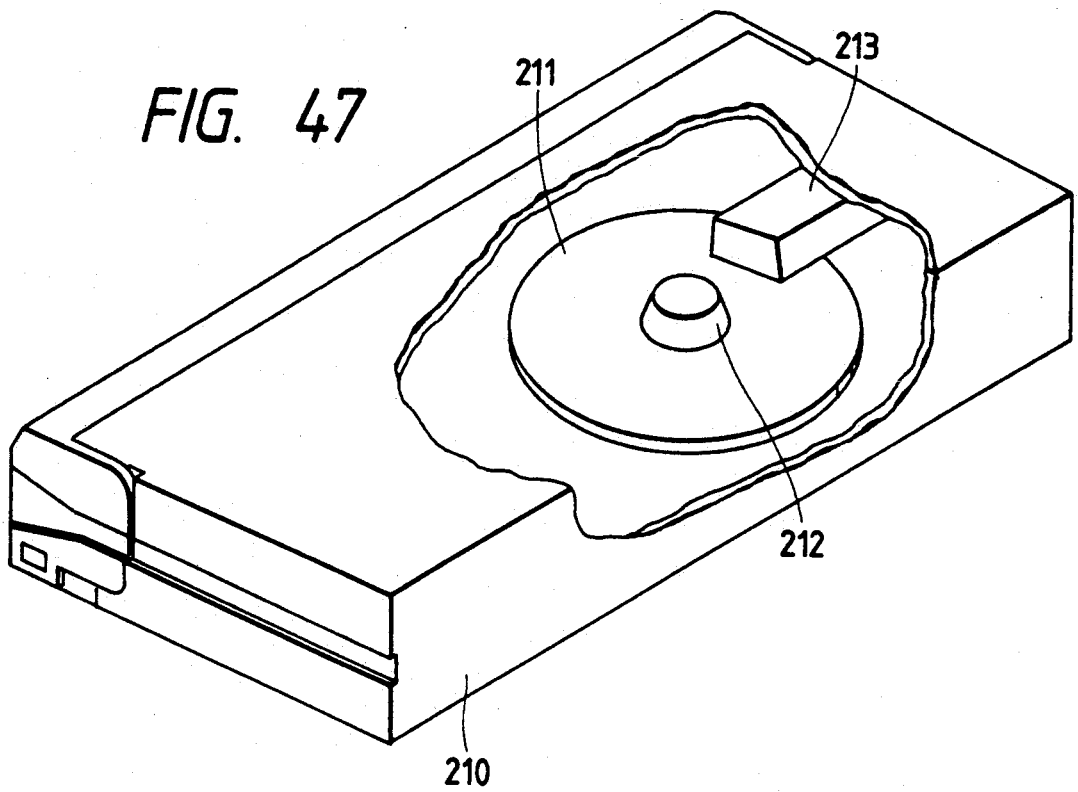

VIDEO RECORDING AND PLAYBACK DEVICE WITH BUILT-IN VIDEO CAMERA IN AN OUTER CASE COMPATIBLE WITH EXISTING TAPE CASSETTE

BACKGROUND OF THE INVENTION

The present invention relates to a video recording and playback device having a video camera incorporated therein.

Video recording and playback devices with built-in video cameras form a large proportion of video tape recorders (hereinafter referred to also as "VTRs") in recent yeas. Various new products of such a design are increasingly offered by different manufacturers. It is expected that a wide variety of video recording and playback devices with built-in video cameras will be produced and used in diverse ways. Consumer needs will definitely demand more simplicity in handling such devices in recording and playback modes.

One conventional video recording and playback device with a built-in video camera, or a video camera with an image playback function, will be described below with reference to FIGS. 1 and 2 of the accompanying drawings. As shown in FIGS. 1 and 2, the video recording and playback device has an outer case 101 with supply and takeup reels 103a, 103b rotatably disposed therein. The device also has a lens 104, a microphone 105, a battery 107 which doubles as part of a grip, and a recording start button 108. In FIG. 1, magnetic tape 109 is withdrawn from the reels 103a, 103b and hence is fully loaded. Video and audio signals are recorded on and reproduced from the magnetic tape 109 by a magnetic head drum 110. Imaging units 128, 129 serve to focus an image of an object properly focused on a sensor and produce an image signal. The imaging units 128, 129 are also referred to as an optical system block and a circuit block, respectively. The device further includes a video/audio/power-receiving circuit which is supplied with electric power from the battery 107 for electrically processing video and audio signals to record or play back them. The image of the object can be monitored by a viewfinder 131 at the time it is recorded or reproduced. The electric power from the battery 107 is switched on and off by a power supply switch 132. The magnetic tape 109 which is wound around the reels 103a, 103b is stored in a tape cassette 136. The tape cassette 136 is positioned in place within the device by a mechanical chassis 137. The chassis 137 also supports a magnetic tape guide means for guiding the magnetic tape 109 to run around the magnetic head drum 110, and a magnetic tape transport means for transporting the magnetic tape 109 in a selected direction at a selected speed.

FIG. 3 shows the manner in which a conventional video recording and playback device 133 with a built-in video camera is used by the user to take pictures, i.e., record images. FIG. 4 illustrates the manner in which a magnetic tape on which images have been recorded by the device 133 is played back by the device 133 itself. FIG. 5 shows the manner in which a magnetic tape on which images have been recorded by the device 133 is played back by a stationary VTR 134. In FIG. 5, the stationary VTR 134 has a cassette insertion slot 135, and an output terminal assembly 137 for video and audio signals. The stationary VTR 134 is connected to a display unit 139 such as a television receiver (hereinafter referred to as a "TV") through the output terminal assembly 137. A larger cassette 138 can be loaded directly into the stationary VTR 134 through the cassette insertion slot 135. A smaller cassette 136 can be placed in an adapter 140 that is of the same size as the larger cassette 138.

Operation of the video recording and playback device 133 will be described below.

In order to record an image of an object with the device 133, the tape cassette 136 matching the device 133 is placed in the device 133, the power supply switch 132 is turned on, and the device 133 is set in a desired position. The magnetic tape 109 in the tape cassette 136 is pulled out of the tape cassette 136 by a tape loading means in the device 133. After the magnetic tape 109 is wound around the magnetic head drum 110 over a certain angular interval, the tape loading means is inactivated to stop the magnetic tape 109. The device 133 is now ready to record images. By holding the device 133 as shown in FIG. 3 and depressing the recording start button 108, the magnetic tape 109 starts running and images can be recorded on the magnetic tape 109. The image recording can be stopped by depressing the recording start button 108 again.

The recorded magnetic tape 109 may be played back in various ways. If the viewfinder 131 has an image display function, it is possible to see reproduced images through the viewfinder 131. Since the images reproduced by the image display function of the viewfinder 131 are very small, it is more general to see recorded images on TV for home use or the like. There are two ways of playing back the magnetic tape 109 on the TV.

According to the first method, as shown in FIG. 4, the tape cassette 136 with the recorded magnetic tape 109 therein is mounted in the device 133, and the magnetic tape 109 is played back by the device 133. An output signal from the device 133 is sent through a connecting cable to the display unit 139 such as TV which displays reproduced images. According to the second method, as shown in FIG. 5, the tape cassette 136 with the recorded magnetic tape 109 therein is mounted in the stationary VTR 134, and the magnetic tape 109 is played back by the stationary VTR 134. The display unit 139 such as TV connected to the stationary VTR 134 now displays reproduced images. If the tape cassettes loaded in the device 133 and the stationary VTR 134 are of the same size, then there is no problem in loading the tape cassette 136. However, the tape cassettes loaded in the device 133 and the stationary VTR 134 may be of different sizes depending on the specifications of the device 133. More specifically, as shown in FIG. 5, if the larger cassette 138 is used as the tape cassette 136 and images are recorded on the magnetic tape therein by the device 133, then the tape cassette 136 can be loaded directly into the stationary VTR 134 for playback. If, however, the smaller cassette 139 is used as the tape cassette 136 and images are recorded on the magnetic tape therein by the device 133, then the tape cassette 136 must first be set in the adapter 140, which is then loaded into the stationary VTR 134 for playback.

The video recording and playback device 133 with a built-in video camera has however been disadvantageous in that the tape cassette 136 having a size matching the device 133 has to be used and loaded beforehand in the device 133 for recording images.

SUMMARY OF THE INVENTION

It is an object of the present invention to provide a video recording and playback device with a built-in video camera, which will eliminate complexities of operation in recording and playback modes.

According to the present invention, there is provided a video recording and playback device with a built-in video camera comprising an outer case having the same profile a that of a tape cassette that can be inserted into an existing magnetic tape apparatus having a playback function, a pair of reels rotatably disposed in the outer case, a magnetic tape wound around the reels, a magnetic head drum in the outer case for recording signals on the magnetic tape, a motor in the outer case for rotating the magnetic head drum, magnetic tape guide means in the outer case for guiding the magnetic tape to run on and around the magnetic head drum, magnetic tape transport means in the outer case for transporting the magnetic tape from one of the reels to the other reel, an imaging unit in the outer case for producing a video signal representative of an image of an object, signal recording means in the outer case for processing the video signal from the imaging unit and enabling the magnetic head drum to record the video signal on the magnetic tape, and power receiving means on the case for receiving electric power to energize the motor, the magnetic tape transport means, the imaging unit, and the signal recording means.

The video recording and playback device further includes a viewfinder having at least one window for passing light from the object therethrough, the window being disposed on the outer case, and a battery detachably mounted on the outer case, the power receiving means including a connector terminal assembly connected to the battery. The reels are detachably mounted in the outer case. The outer case has a lid which is openable and closable and can be used as a grip when opened.

The video recording and playback device further includes a viewfinder having at least one window for passing light from the object therethrough, and a button for operating the device, the window and the button being mounted on the outer case behind the lid.

The outer case has a lid which is openable and closable, further including a power supply switch mounted on the outer case and operable to switch on and off the electric power in response to opening and closing movement of the lid.

The video recording and playback device further includes holder means on the outer case for holding the lid open, signal reproducing means in the outer case for reproducing a signal recorded on the magnetic tape, and connector terminal means on the outer case for sending a monitor signal including the video signal from the imaging unit or a reproduced output signal from the signal reproducing means to the magnetic tape apparatus which is outside of the outer case.

The video recording and playback device may include a display unit mounted on the outer case and connected to the connector terminal means.

The magnetic tape apparatus comprises a video tape recorder, further including a microphone on the outer case, the signal recording means comprising means for recording an audio signal from the microphone on the magnetic tape, the signal reproducing means comprising means for reproducing the audio signal from the magnetic tape, the power receiving means having a connector terminal assembly connected to the battery and a connector terminal assembly connectable to power supply means in the video tape recorder, the connector terminal means comprising means for sending the signal to the video tape recorder.

The video tape recorder comprises a stationary video tape recorder, the stationary video tape recorder having a cassette holder for placing the outer case thereon and loading the outer case into the video tape recorder.

There is also provided a video recording and playback device with a built-in video camera comprising an outer case having the same profile as that of a tape cassette that can be inserted into an existing magnetic tape apparatus having a playback function, a recording medium disposed in the outer case, an imaging unit in the outer case for producing a video signal representative of an image of an object, a microphone disposed on the outer case, signal recording means in the outer case for processing signals from the imaging unit nd the microphone and recording video and audio signals on the recording medium, and power receiving means on the case for receiving electric power to energize the imaging unit, the microphone, and the signal recording means.

The recording medium comprises a substantially disk-shaped medium having an optically transparent member and an optically reflective member which are superposed one on the other, the signal recording means including at least light-emitting means for applying light to the recording medium.

The recording medium comprises a substantially disk-shaped magnetic sheet, the signal recording means comprising means for converting an electric signal to a magnetic field. The recording medium may be made of a photochemical hole burning material.

There is further provided a video recording and playback device with a built-in video camera comprising an outer case having the same profile as that of a tape cassette that can be inserted into an existing magnetic tape apparatus having a playback function, battery means detachably mounted on the outer case, a pair of reels rotatably disposed in the outer case, a magnetic tape wound around the reels, a magnetic head drum in the outer case for recording signals on the magnetic tape, a motor in the outer case for rotating the magnetic head drum, magnetic tape guide means in the outer case for guiding the magnetic tape to run on and around the magnetic head drum, magnetic tape transport means in the outer case for transporting the magnetic tape from one of the reels to the other reel, an imaging unit in the outer case for producing a video signal representative of an image of an object, signal recording means in the outer case for processing the video signal from the imaging unit and enabling the magnetic head drum to record the video signal on the magnetic tape, and power receiving means on the case for receiving electric power to energize the motor, the magnetic tape transport means, the imaging unit, and the signal recording means, the power receiving means including at least a connector terminal assembly connected to the battery means.

The battery means is housed within the outer case. The power receiving means is electrically connectable to the magnetic tape apparatus and a display unit.

The outer case has a pair of cassette reel base receiving holes defined therein, the battery means comprising a pair of batteries detachably disposed in the cassette reel base receiving holes, respectively.

The battery means comprises a battery mounted on a bottom of the outer case when images are recorded by the device. The battery has a wider base remote from a side thereof coupled to the bottom of the outer case.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a rear elevational view of the device with a lid being open;

FIG. 12 is a righthand side elevational view of the device;

FIG. 23 is a front elevational view, partly broken away, of the device with a video display unit added thereto;

FIG. 24 is a righthand side elevational view of the device with the video display unit shown in FIG. 23;

FIG. 26 is a fragmentary front elevational view of the device shown in FIG. 25, illustrating a battery storage area;

FIG. 27 is a front elevational view of the device shown in FIG. 25, partly in cross section taken along line XXVII—XXVII of FIG. 25;

FIG. 42 is a rear elevational view of a video recording and playback device with a built-in video camera according to a fourth embodiment, with a lid being open;

FIG. 43 is a righthand side elevational view of the device shown in FIG. 42;

FIG. 47 is a perspective view, partly broken away, of a video recording and playback device with a built-in video camera according to a sixth embodiment of the present invention.

DETAILED DESCRIPTION

Figure 1:
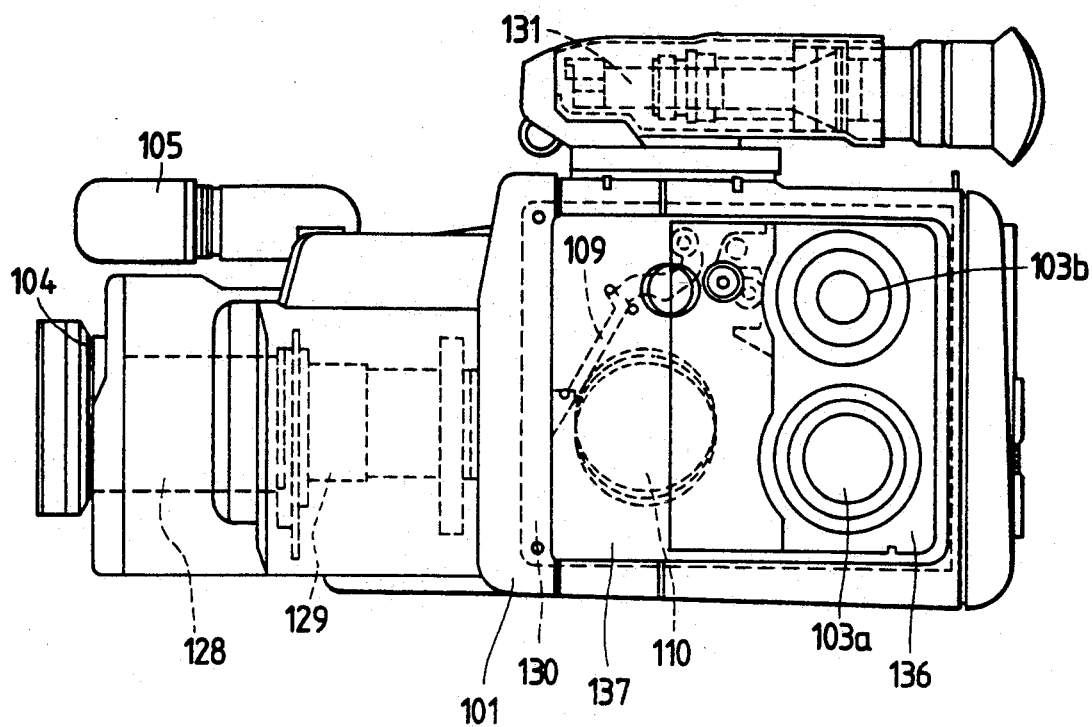
FIGS. 1 and 2 are side and rear elevational views, respectively, of a conventional video camera with an image playback function, FIG. 2 being a partly cross-sectional view taken along line II—II of FIG. 1.
Figure 2:
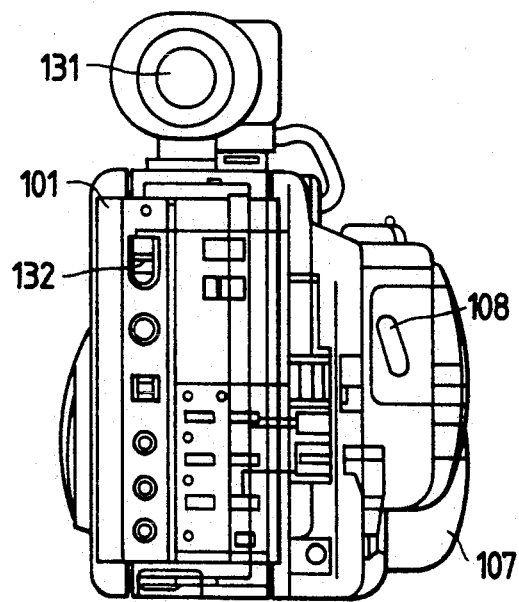
Figure 3:
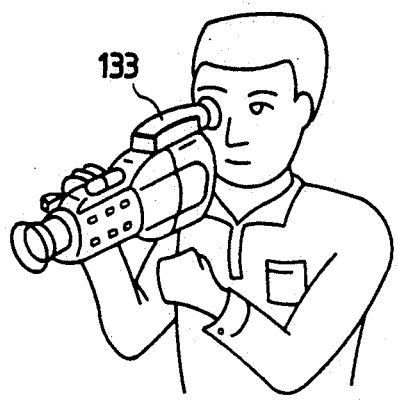
FIG. 3 is a perspective view showing the manner in which a conventional video camera with an image playback function is used for recording images.
Figure 4:
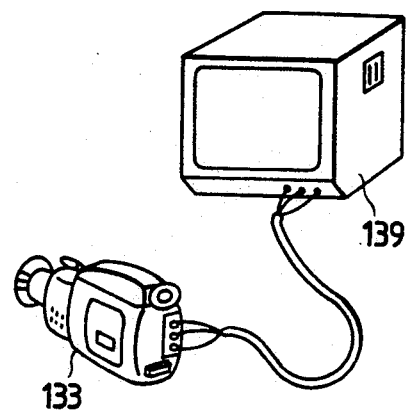
FIG. 4 is a perspective view showing the manner in which a magnetic tape recorded by the conventional video camera is played back by the video camera itself.
Figure 5:
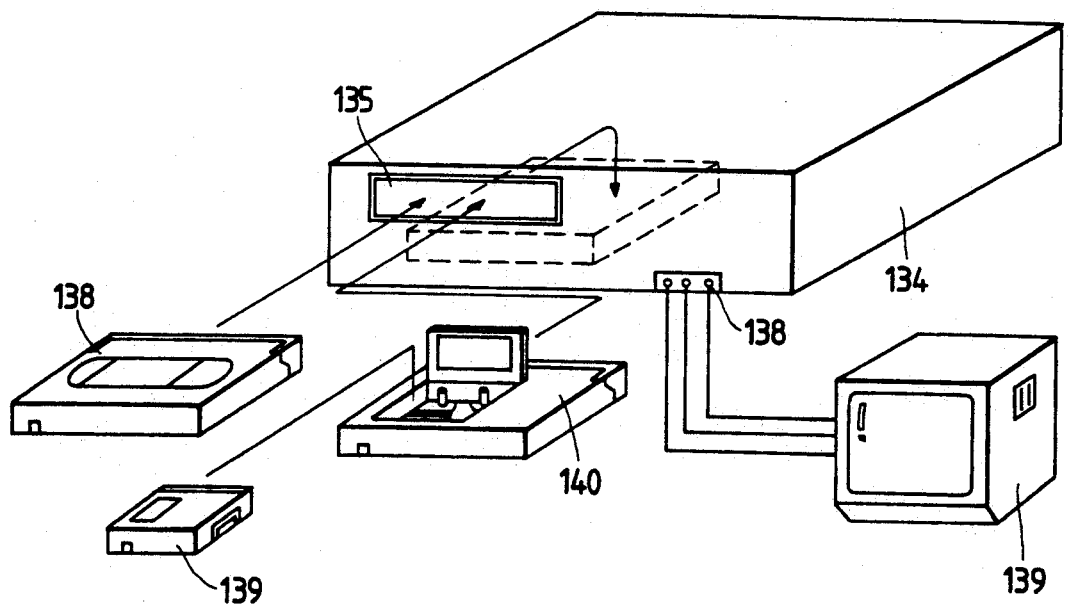
FIG. 5 is a perspective view showing the manner in which a magnetic tape recorded by the conventional video camera is played back by a stationary VTR.
Figure 6:
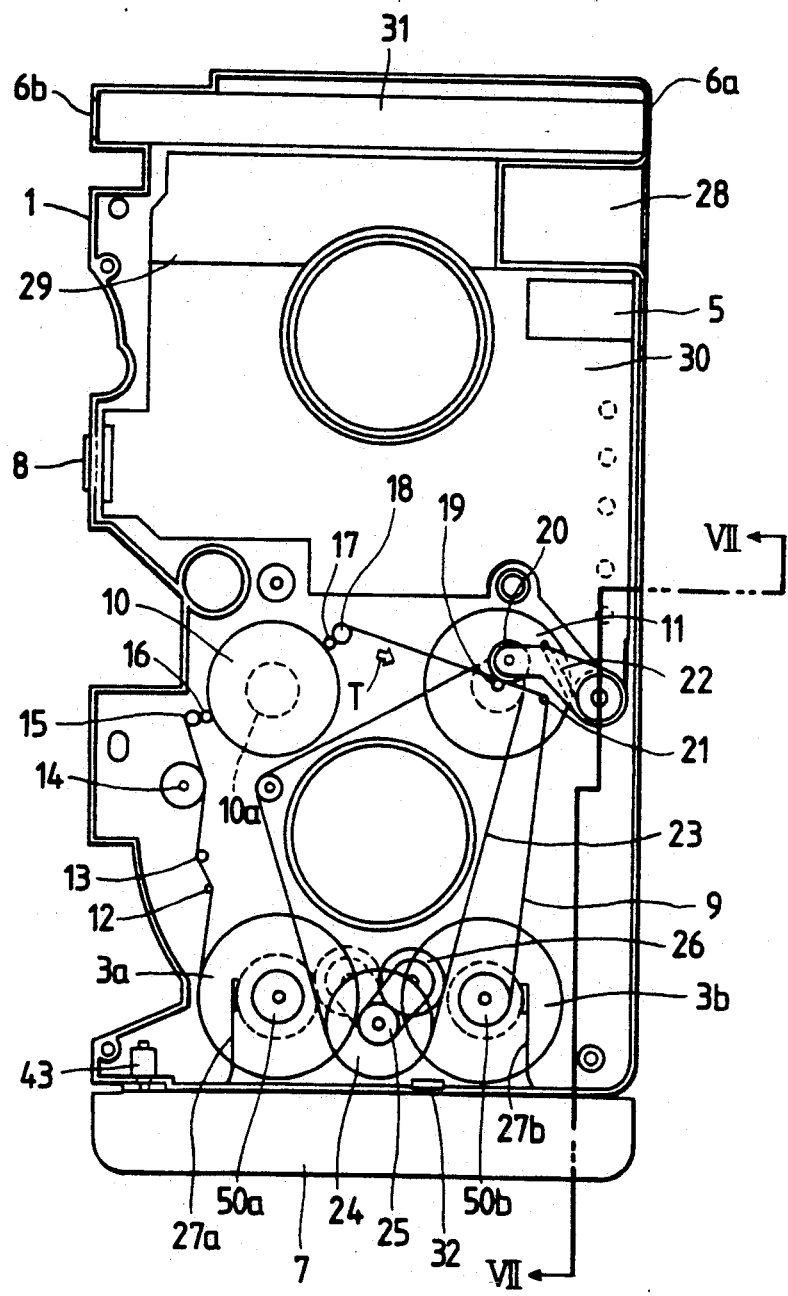
FIG. 6 is a lefthand side elevational view of a video recording and playback device with a built-in video camera according to a first embodiment of the present invention, the view showing major components of the device.
Figure 7:
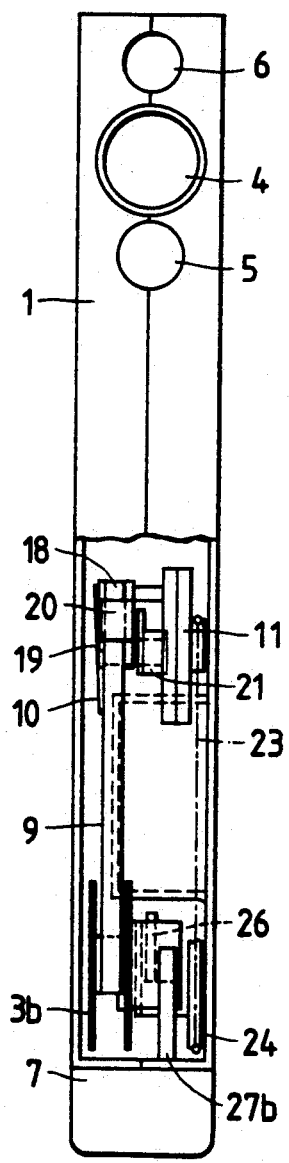
FIG. 7 is a front elevational view of the device shown in FIG. 6, partly in cross section taken alone line VII-—VII of FIG. 6.

FIGS. 6 and 7 show a video recording and playback device with a built-in video camera according to a first embodiment of the present invention. In FIG. 6, an outer case 1 is partly omitted from illustration and a lid 2 is omitted from illustration. As shown in FIGS. 6 and 7, the outer case 1 of the device is of an outer profile which is the same as that of a tape cassette that can be loaded into a magnetic tape apparatus having a playback function, o that the device can be loaded into the magnetic tape apparatus. The magnetic tape apparatus is a stationary video tape recorder (VTR) of existing predetermined dimensions, and the outer case 1 is in the form of a rectangular parallelepiped and has existing predetermined dimensions for insertion into the VTR. The device has supply and takeup reels 3a, 3b rotatably disposed in the outer case 1 and detachably engaging supply and takeup reel bases 50a, 50b, respectively. A magnetic tape 9 is wound around the supply and takeup reels 3a, 3b.

A magnetic head drum 10 serves to record video and audio signals o the magnetic tape 9 and reproduce video and audio signals from the magnetic tape 9. The magnetic head drum 10 is rotated about its own axis by a motor 10a. The magnetic tape 9 is transported by a magnetic tape transport means comprising a capstan motor 11. While being transported, the magnetic tape 9 is guided around the magnetic head drum 10 by magnetic tape guide means comprising magnetic tape guide posts 12 through 18 and 21. The capstan motor 11 has a capstan shaft 19 against which the magnetic tape 9 is pressed by a pinch roller 20. When the capstan motor 11 is energized, the capstan shaft 19 and the pinch roller 20 grip and feed the magnetic tape 9. The pinch roller 20 is normally biased toward the capstan shaft 1 by a spring-loaded pinch roller arm 22. A drive belt 23 is trained around a pulley on the capstan shaft 19 and an idler pulley 24 positioned between the reels 3a, 3b. An idler arm 25 has one end supported concentrically on the idler pulley 24. An idler roller 26 is rotatably supported on the other end of the idler arm 25. In response to energization of the capstan motor 11, the idler arm 25 is angularly moved about the center of the idler pulley 24 in a direction depending on the direction of rotation of the capstan motor 11 to bring the idler roller 26 into rolling contact with the reel base 50a or 50b. Supply and takeup reel brakes 27a, 27b are held in contact with the supply and takeup reel bases 50a, 50b in all modes of operation of the device.

The device also has an imaging unit including an optical system 28 and an electric circuit 29 which produces a video signal indicative of an image of an object which is to be recorded. A circuit block 30 contains a signal processing circuit for processing video and audio signals, the signal processing circuit including a signal recording means for recording video and audio signals on the magnetic tape 9 through the magnetic head drum 10 and a signal reproducing means for reproducing video and audio signals recorded on the magnetic tape 9. The circuit block also contains a power receiving circuit for receiving electric power from an external source through a battery and processing the received electric power to energize the motor 10a of the magnetic head drum 10 and the signal processing circuit. The circuit block thus serves as a video/audio/power receiving circuit assembly. A viewfinder 31 passes light from the object therethrough for the user to see the image of the object. The power receiving circuit has power receiving terminals 32. When a battery 7 is mounted on the device, electric power is supplied from the battery 7 to the circuit block 30 through the power receiving terminals 32.

Figure 10:
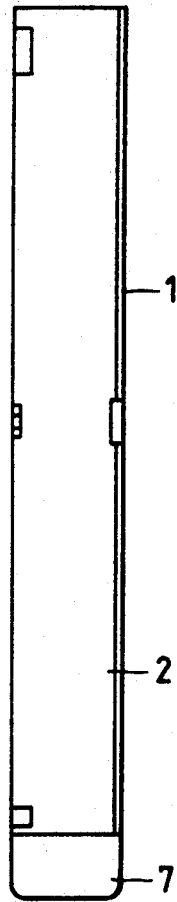
FIG. 10 is a rear elevational view of the device.
Figure 9:
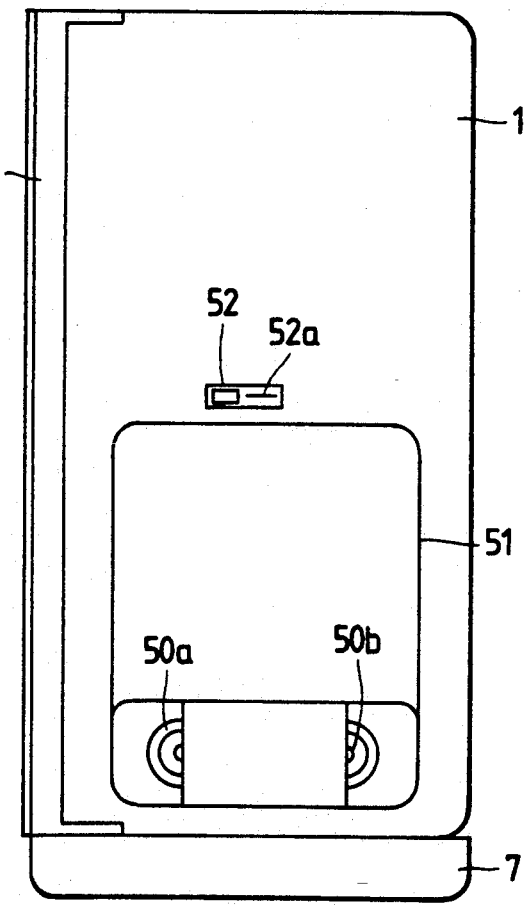
FIG. 9 is a lefthand side elevational view of the device.
Figure 8:
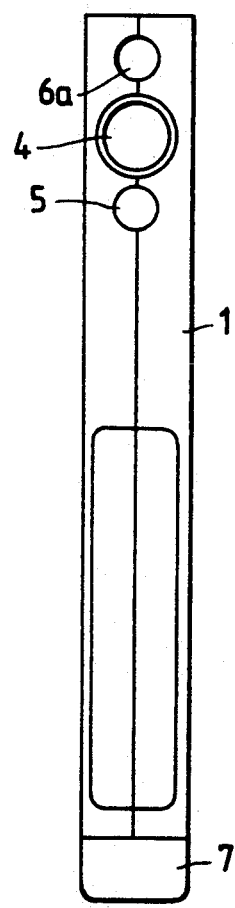
FIG. 8 is a front elevational view of the device.

As shown in FIGS. 8 through 10, the lid 2 is pivotally supported on the outer case 1 so as to be angularly openable and closable about at least one pivot on the outer case 1. The outer case 1 and the lid 2 are of the same size and shape as those of a tape cassette which is of existing predetermined dimensions. An objective lens 4 for introducing an image of the object is mounted on a side of the outer case 1. A microphone 5 for picking up sounds is disposed below the objective lens 4. The viewfinder 31 includes an objective window 6a (see FIG. 6 also) for introducing light into the viewfinder 31. The battery 7 is detachably mounted on the outer case 1. The outer case 1 includes an openable and closable tape cover 51 for covering the reels 3a, 3b. The tape cover 51 can be opened by operating a tape eject switch 52. More specifically, when the tape eject switch 52 is slid in the direction indicated by the arrow 52a (FIG. 9), the tape cover 51 is swung in the direction indicated by the arrow P (FIG. 13) about a hinge under the bias of a spring (not shown). With the tape cover 51 being thus open, the supply and takeup reels 3a, 3b which wind the magnetic tape 9 therearound can be brought into and out of engagement with the supply and takeup reel bases 50a, 50b, respectively, in the device.

As shown in FIGS. 11 and 12, the viewfinder 31 also has an eyepiece window 6b (see FIG. 6 also) for the user to look into. A recording start button 8 for starting and stopping a recording process is disposed on the side of the outer case 1 which is covered by the lid 2. The outer case 1 supports an output signal terminal assembly 41 serving as connecting means for supplying video and audio output signals reproduced from the recorded magnetic tape 9 to an external apparatus such as a stationary VTR. The outer case 1 also supports a power supply terminal assembly 42 serving as connecting means for receiving electric power from an external apparatus such as a stationary VTR having its own power supply when the device is directly loaded in the VTR.

A power supply switch 43 (see FIG. 6 also) serves to switch on and off the electric power from the battery 7. The power supply switch 43 includes an actuating member 43a.

Figure 14A:
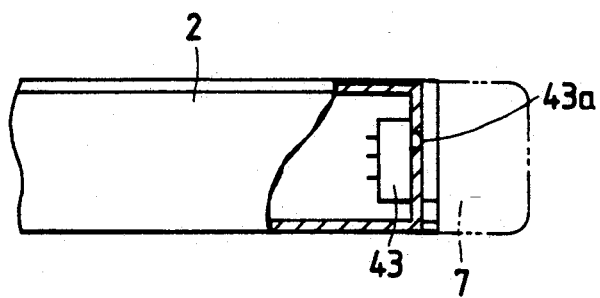
FIGS. 14(a) and 14(b) are views illustrating the relationship between the lid and a power supply switch, FIG. 14(a) being a partly cross-sectional view taken along line XIV(a)-XIV(a) of FIG. 14(b)
Figure 14B:
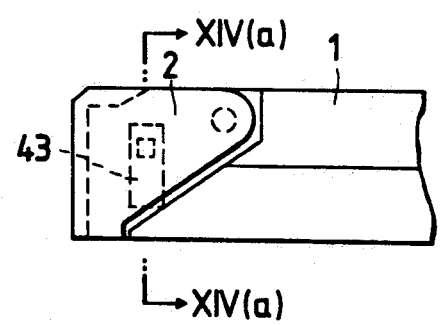
Figure 15A:
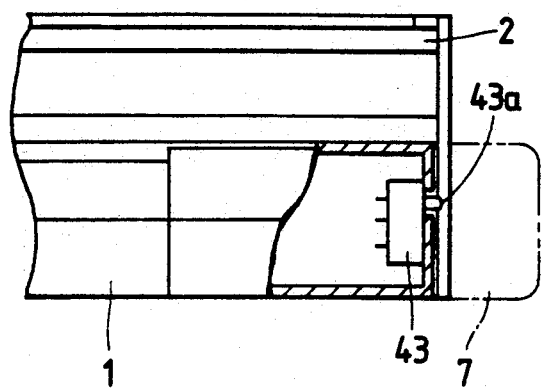
FIGS. 15(a) and 15(b) are views showing the device with the lid being open.
Figure 15B:
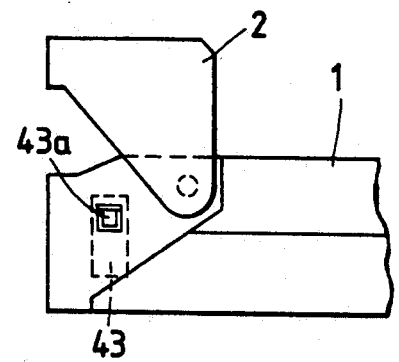
Figure 16A:
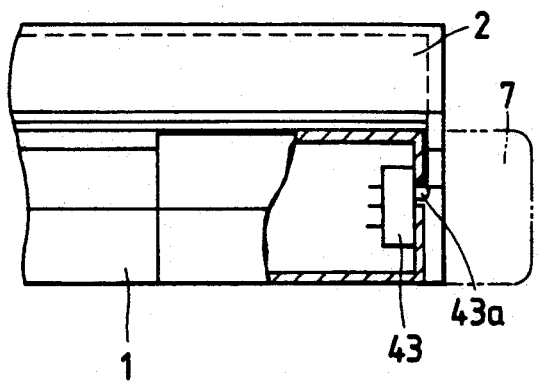
FIGS. 16(a) and 16(b) are views showing the device with the lid being held by abutment against a lid holding angle in a magnetic tape apparatus.
Figure 16B:
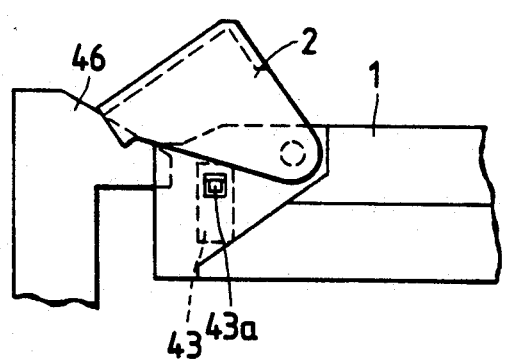

FIGS. 14(a), 14(b), 15(a), 15(b), and 16(a), 16(b) show the relationship between the lid 2 and the power supply switch 43 when the lid 2 is opened and closed. As shown in FIGS. 14(a) and 14(b), when the lid 2 is closed, the actuating member 43a of the power supply switch 43 is pushed in by engagement with a side of the lid 2. With the actuating member 43a pushed in, the power supply switch 43 is turned off, and electric power from the battery 7 is cut off. As shown in FIGS. 15(a) and 15(b), when the lid 2 is fully opened, the actuating member 43a is released and projects from an outer surface of the outer case 1, thereby turning on the power supply switch 43. Now, electric power from the battery 7 is supplied. In FIGS. 16(a) and 16(b), the device is loaded fully into a magnetic tape apparatus such as a stationary VTR of existing predetermined dimensions. The magnetic tape apparatus has a lid holding angle 46 disposed therein for holding the lid 2 open to leave the power supply switch 43 on.

Figure 17A:
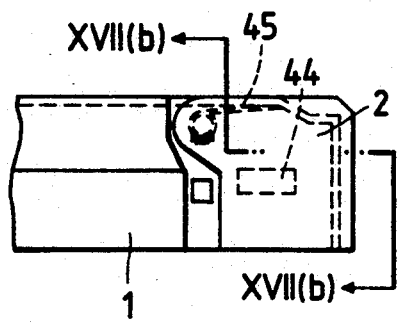
FIGS. 17(a) and 17(b) are views illustrative of the relationship between the lid and a lock member, FIG. 17(b) being a partly cross-sectional view taken along line XVII(b)—XVII(b) of FIG. 17(a)
Figure 17B:
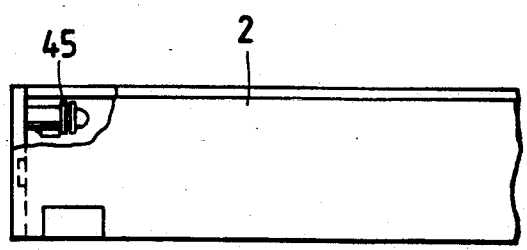
Figure 18A:
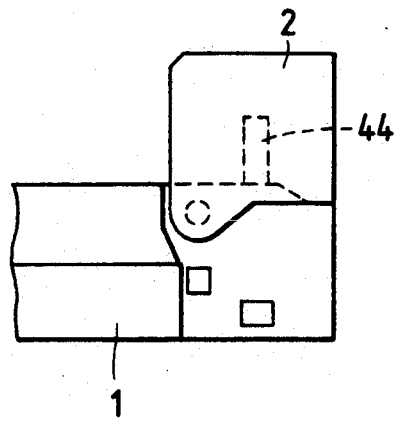
FIGS. 18(a) and 18(b) are views showing the manner in which the lid is open and held in position.
Figure 18B:
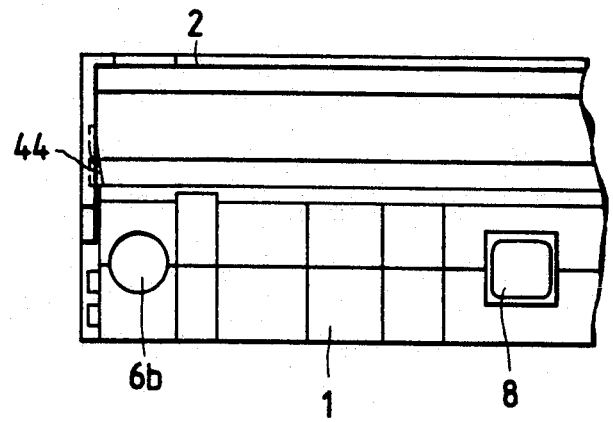
Figure 19A:
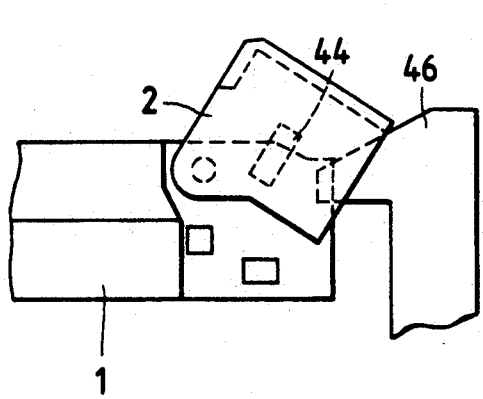
FIGS. 19(a) and 19(b) are views showing the device loaded in the magnetic tape apparatus with the lid being held by abutment against the lid holding angle.
Figure 19B:
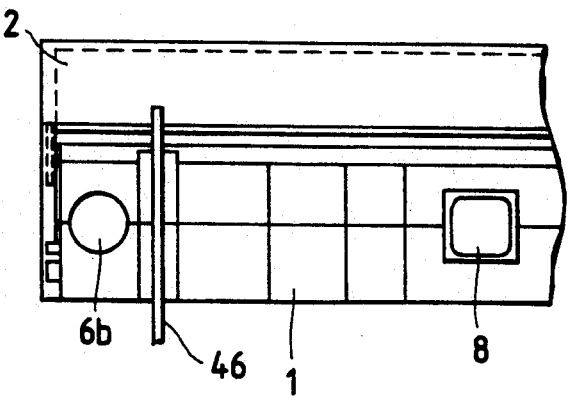

FIGS. 17(a), 17(b), 18(a), 18(b), and 19(a), 19(b) illustrate the relationship between the lid 2 and a lid lock finger when the lid 2 is opened and closed. As shown in FIGS. 17(a) and 17(b), a lid lock finger 44 is integrally formed with the lid 2 and is made of a flexible material such as a synthetic resin. The lid 2 is normally urged into a closed position by a return spring 45. When the lid 2 is closed, the lid lock finger 44 is ineffective and sandwiched between the lid 2 and the outer case 2. When the lid 2 is fully opened as shown in FIGS. 18(a) and 18(b), the lid lock finger 44 is released from contact with the outer case 1, and springs back under its own resiliency into its original shape projecting from the surface of the lid 2. The lid lock finger 44 abuts against the upper surface (as shown) of the outer case 2, thereby preventing the lid 2 from being closed under the bias of the return spring 45. FIGS. 19(a) and 19(b) show the device which is fully loaded into the magnetic tape apparatus. When the device is fully loaded into the magnetic tape apparatus, the lid 2 is not opened to the position shown in FIGS. 18(a) and 18(b). Since the lid lock finger 44 remains ineffective, the lid 2 tends to be closed. However, the lid 2 is held against the lid holding angle 46 and hence remains open as shown.

Figure 20:
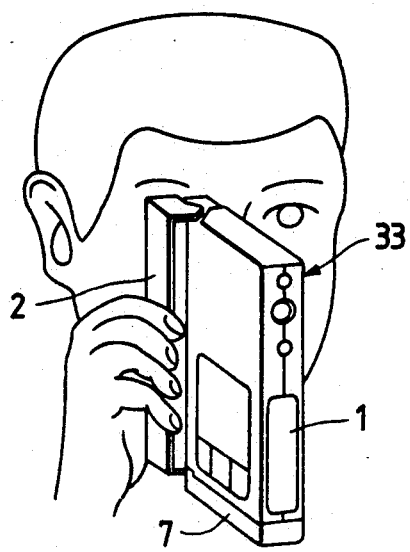
FIG. 20 is a perspective view showing the manner in which the video recording and playback device of the first embodiment is used for recording images.
Figure 21:
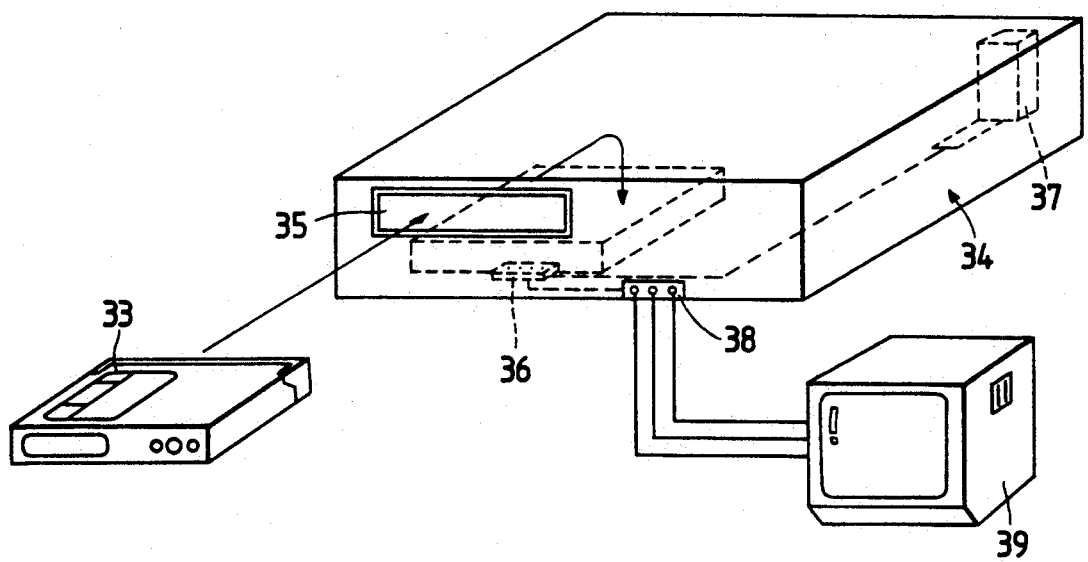
FIG. 21 is a perspective view showing the manner in which the video recording and playback device is used for reproducing recorded images.

FIGS. 20 and 21 show how the device of the first embodiment is used to record images and also how the device is used to reproduce recorded images. In FIGS. 20 and 21, the device of the first embodiment is indicated at 33, and the magnetic tape apparatus or stationary VTR is indicated at 34. Tape cassettes of predetermined dimensions which are of the same size and shape as the device 33 can be loaded directly into the stationary VTR 34. The stationary VTR 34 has a cassette insertion slot 35, a connector terminal assembly 36 for connection to the connecting means of the device 33, a power supply 37, and an output terminal assembly 38. A display unit 39 such as a TV is connected to the stationary VTR 34 through the output terminal assembly 38 through a cable for reproducing video and audio output signals from the device 33. The power supply 37 and the output terminal assembly 38 are electrically connected to the connector terminal assembly 36.

Figure 22:
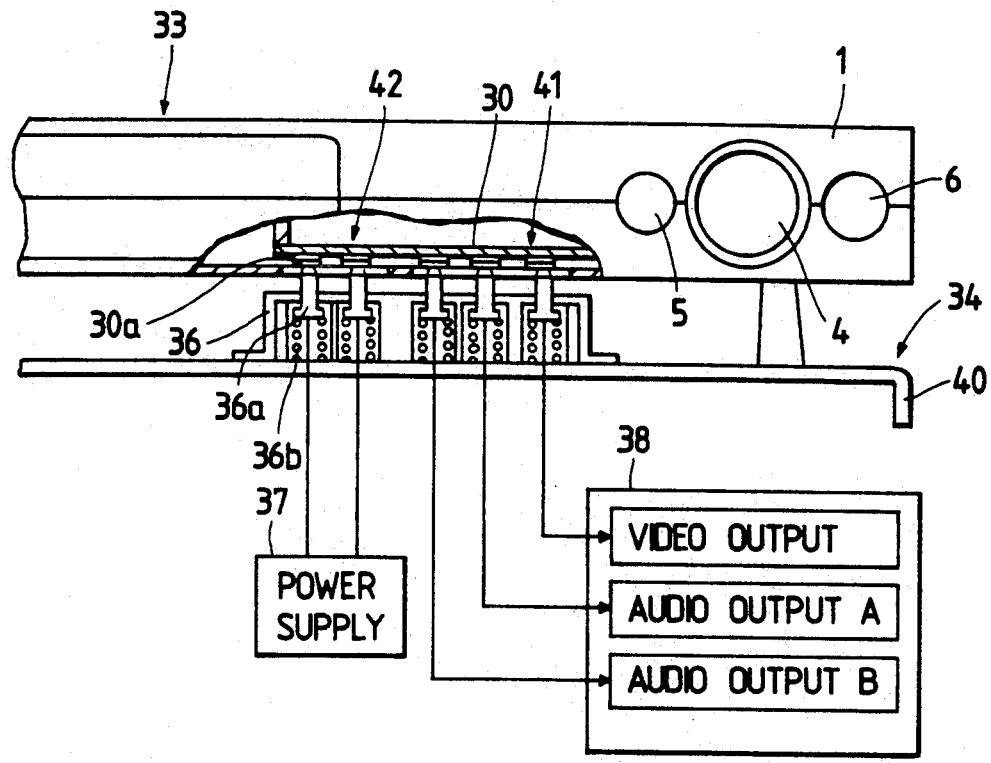
FIG. 22 is a view showing the manner in which output signal terminals and power supply terminals are connected to an external apparatus when the device is loaded in the external apparatus.

FIG. 22 shows the output signal terminal assembly 41 and the power supply terminal assembly 42 which are connected to the stationary VTR 34. The terminal assemblies 41, 42 have five conductors 30a on the baseboard of the video/audio/power receiving circuit 30 in the device 33. The conductors 30a have surfaces disposed inwardly of the outermost surface of the outer case 1. The connector terminal assembly 36 includes five terminals 36a connected to the power supply 37 and the output terminal assembly 38, and five springs 36b for resiliently pressing the terminals 36a against the conductors 30a to keep them electrically conductive.

The connector terminal assembly 36 is supported on a mechanical chassis of the stationary VTR 34.

Two out of the five conductors 30a and corresponding two out of the five terminals 36a serve to receive electric power from the power supply 37 in the stationary VTR 34, whereas the remaining three conductors 30a and three terminals 36a serve to send a video output signal and two audio output signals from the device 33 to the stationary VTR 34.

Operation of the device 33 will now be described with reference to FIGS. 6 through 22.

Figure 13:
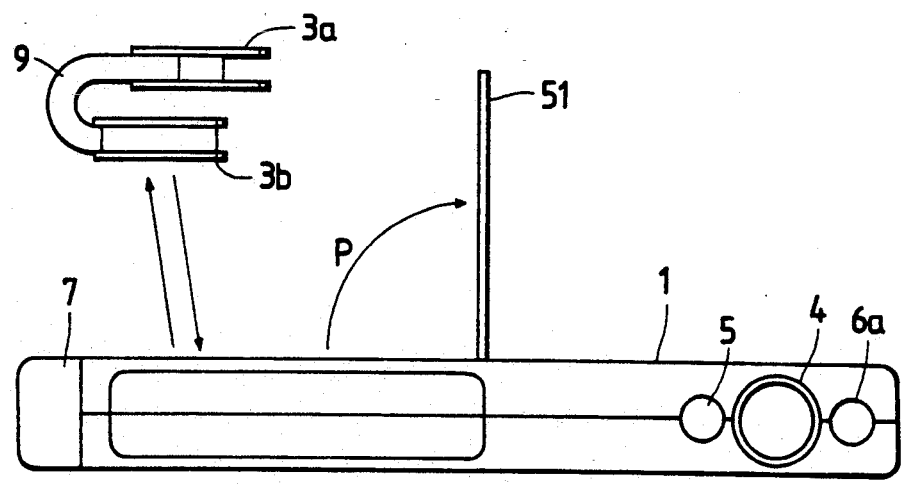
FIG. 13 is a view illustrative of the manner in which reels are installed and removed.

First, the tape eject switch 52 (FIG. 9) is slid in the direction indicated by the arrow 52a thereby to allow the tape cover 51 to swing as shown in FIG. 13. Then, the reels 3a, 3b with the magnetic tape 9 wound therearound are installed respectively onto the reel bases 50a, 50b. The magnetic tape 9 is manually guided around the guide posts 12 through 18, 21 and the magnetic head drum 10, and also inserted between the capstan shaft 19 and the pinch roller 20, thus forming a tape running path as shown in FIG. 6. The tape cover 51 is thereafter closed. The magnetic tape 6 is now fully loaded in the device 33. The magnetic tape 6 can be removed by reversing the above tape loading process.

An image of an object can be recorded on the magnetic tape 6 as follows: The battery 7 is mounted on the outer case 1, and the lid 2 is opened to the position shown in FIGS. 15(a), 15(a) and 18(a), 18(b). The power supply switch 43 is therefore turned on and the lid 2 is locked in its open position as described above, making the device 33 ready to record the image. The user holds the device 33 by gripping the lid 2, and sees the object through the viewfinder 6 as shown in FIG. 20, and then presses the recording start button 8. At this time, the magnetic tape 9 has already been loaded in the device 33 as shown in FIG. 6, extending from the supply reel 3 around the magnetic head drum 10 and the guide posts 12 through 18, 21 to the takeup reel 3b. When the recording start button 8 is pushed, the magnetic tape 9 is fed in the direction indicated by the arrow T in FIG. 6 at a predetermined speed, while recording the image.

The rotative power from the capstan motor 11 is transmitted through the drive belt 23 to the idler pulley 24 which turns the idler arm 25 into the solid-line position (FIG. 6) for thereby bringing the idler roller 26 into rolling contact with the takeup reel base 50a. In this manner, the magnetic tape 9 is wound around the takeup reel 3b which is rotated by the takeup reel base 50a. When the capstan motor 11 is reversed, the idler arm 25 is turned into the broken-line position for rotating the supply reel base 50a backwards to cause the supply reel 3a to wind the magnetic tape 9. After the image has been recorded on the magnetic tape 9 and the magnetic tape 9 is fully fed until its terminal end is reached, the magnetic tape 9 automatically starts to be rewound onto the supply reel 3a by the reversal of the capstan motor 11. The magnetic tape 9 stopped in its rewinding process when it is wound back to its starting end.

The recorded image is reproduced as follows: As described above, the device 33 is of the same size and shape as those of tape cassettes of the existing dimensions. When the recorded magnetic tape 9 is to be played back, only the battery 7 is detached from the device 33, and the device 33 is inserted into the stationary VTR 34 through the cassette insertion slot 35. After the device 33 has fully been loaded into the stationary VTR 34, the lid 2 of the device 33 is opened as shown in FIGS. 16(a), 16(b) and 19(a), 19(b), and the power supply switch 43 is automatically turned on. At the same time, the conductors 30a of the terminal assemblies 41, 42 of the device 33 are brought into electric contact with the terminals 36a of the terminal assembly 36 of the stationary VTR 34, so that electric power for energizing the device 33 is automatically supplied from the power supply 37 in the stationary VTR 34. A playback start signal is produced to start moving the magnetic tape 9 in the device 33 in the same manner as described above. Video and audio output signals reproduced from the magnetic tape 9 are then sent from the device 33 through the stationary VTR 34 and the output terminal assembly 38 to the display unit 39, which now displays the recorded image. In order to stop the playback mode or remove the device 33 from the stationary VTR 34, an eject button (not shown) of the stationary VTR 34 is pushed.

In the above first embodiment, the reproduced video and audio output signals are sent to the stationary VTR 34 and the display unit 39 connected to the stationary VTR 34. However, the video and audio output signals may be sent to another display unit 47 (FIGS. 23 and 24) such as a liquid crystal display unit which is mounted directly on the outer case 1 and electrically connected to the terminal assembly 41 of the device 33, so that the recorded image can be displayed on the display unit 47. In this case, the battery 7 remains connected to the device 33.

Instead of installing the individual reels 3a, 3b with the magnetic tape 9 wound therearound into the device 33 as shown in FIG. 13, a cassette which houses therein the reels 3a, 3b with the magnetic tape 9 wound therearound may be installed into the device 33. This modification allows the magnetic tape to be stored and handled with ease.

The stationary VTR 34 may be of the type which has a cassette holder for placing the outer case 1 thereon and loading the device 33 into the stationary VTR 34. At least one set of the reels 3a, 3b, at least one set of the viewfinder windows 6a, 6b, and at least one recording start button 8 are sufficient for use on the device 33. The outer case 1 may be identical or substantially identical in shape to existing tape cassettes.

The terminal assembly 41 for delivering video and audio output signals from the device 33 to the stationary VTR 34 may include additional terminals for supplying monitor signals including a video signal from the imaging unit 27 and audio signals from the microphone 5.

FIGS. 25 through 34 show a video recording and playback device with a built in video camera according to a second embodiment of the present invention.

Figure 25:
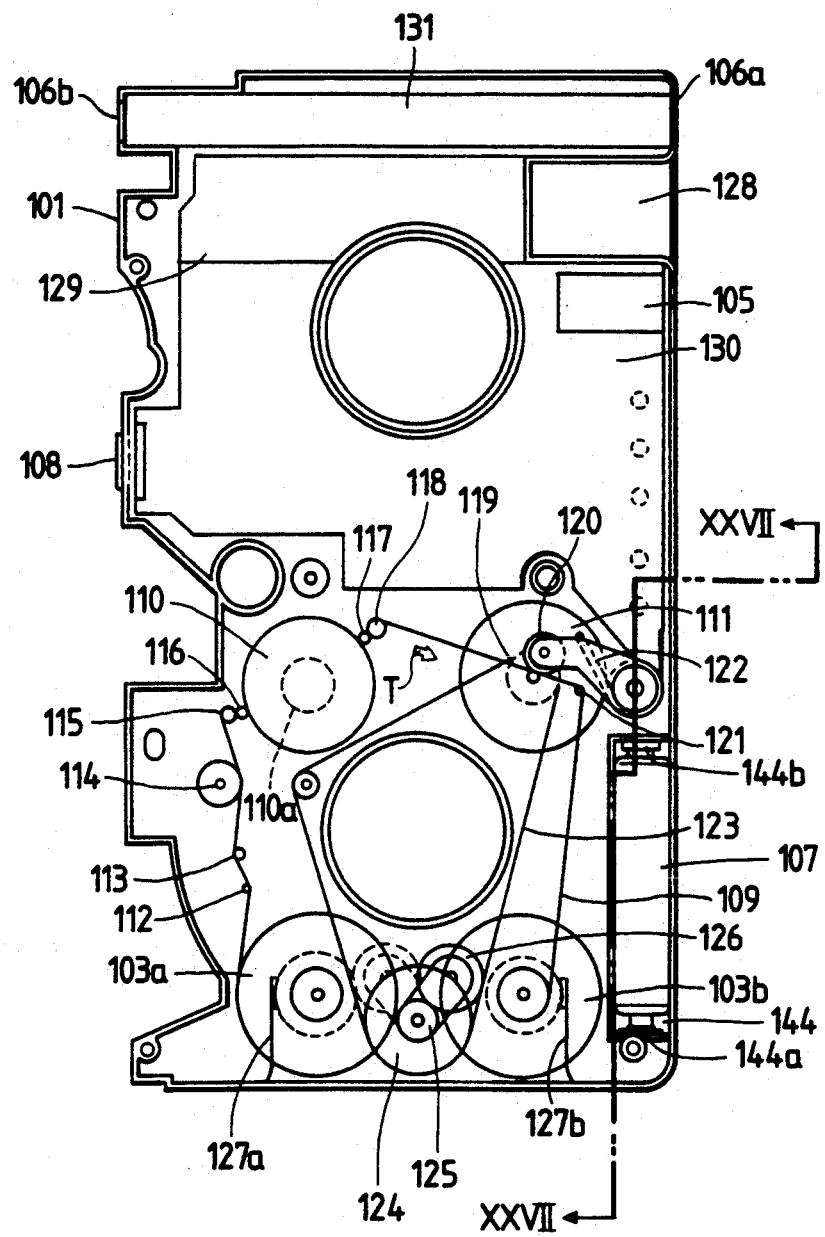
FIG. 25 is a lefthand side elevational view of a video recording and playback device with a built-in video camera according to a second embodiment of the present invention, the view showing major components of the device.

As shown in FIGS. 25 through 27, the video recording and playback device has an outer case 101 having an outer profile which is the same as that of a tape cassette that can be loaded into a magnetic tape apparatus having a playback function, so that the device can be loaded into the magnetic tape apparatus. The magnetic tape apparatus is a stationary video tape recorder (VTR) of existing predetermined dimensions, and the outer case 101 is in the form of a rectangular parallelepiped and has existing predetermined dimensions for insertion into the VTR. The device has supply and takeup reels 103a, 103b rotatably disposed in the outer case 101. A battery 107 such as an alkaline dry cell is disposed in the outer casing 101 along one side thereof. A magnetic tape 109 is wound around the supply and takeup reels 103a, 103b.

A magnetic head drum 110 serves to record video and audio signals on the magnetic tape 109 and reproduce video and audio signals from the magnetic tape 109. The magnetic head drum 110 is rotated about its own axis by a motor 110a. The magnetic tape 109 is transported by a magnetic tape transport means comprising a capstan motor 111. While being transported, the magnetic tape 109 is guided around the magnetic head drum 110 by magnetic tape guide means comprising magnetic tape guide posts 112 through 118 and 121. The capstan motor 111 has a capstan shaft 119 against which the magnetic tape 109 is pressed by a pinch roller 120. When the capstan motor 111 is energized, the capstan shaft 119 and the pinch roller 120 grip and feed the magnetic tape 109. The pinch roller 120 is normally biased toward the capstan shaft 119 by a spring-loaded pinch roller arm 122. A drive belt 123 is trained around a pulley on the capstan shaft 119 and an idler pulley 124 positioned between the reels 103a, 103b. An idler arm 125 has one end supported concentrically on the idler pulley 124. An idler roller 126 is rotatably supported on the other end of the idler arm 125. In response to energization of the capstan motor 111, the idler arm 125 is angularly moved about the center of the idler pulley 124 in a direction depending on the direction of rotation of the capstan motor 111 to bring the idler roller 126 into rolling contact with the reel 103a or 103b. Supply and takeup reel brakes 127a, 127b are held in contact with the supply and takeup reels 103a, 103b in all modes of operation of the device.

The device also has an imaging unit including an optical system 128 and an electric circuit 129 which produces a video signal indicative of an image of an object which is to be recorded. A circuit block 130 contains a signal processing circuit for processing video and audio signals, the signal processing circuit including a signal recording means for recording video and audio signals on the magnetic tape 109 through the magnetic head drum 110 and a signal reproducing means for reproducing video and audio signals recorded on the magnetic tape 109. The circuit block also contains a power receiving circuit for receiving electric power from an external source through a battery and processing the received electric power to energize the motor 110a of the magnetic head drum 110 and the signal processing circuit. The circuit block thus serves as a video/audio/power receiving circuit assembly. A viewfinder 131 passes light from the object therethrough for the user to see the image of the object. The battery 107 is stored in a battery storage housing 144 having a contact 144a for contacting the positive terminal of the battery 107 and a contact 144b for contacting the negative terminal of the battery 107. At least one of the contacts 144a, 144b is resilient so that when the battery 107 is placed in the battery storage housing 144, the positive and negative terminals of the battery 107 are electrically connected to the contacts 144a, 144b, and the battery 107 is detachably stored.

Figure 30:
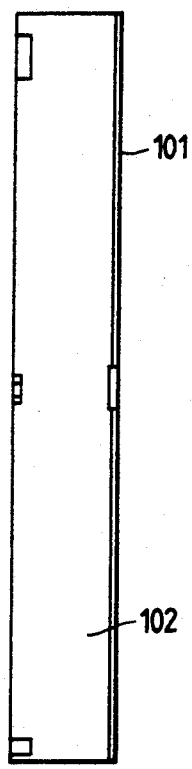
FIG. 30 is a rear elevational view of the device shown in FIG. 25.
Figure 29:
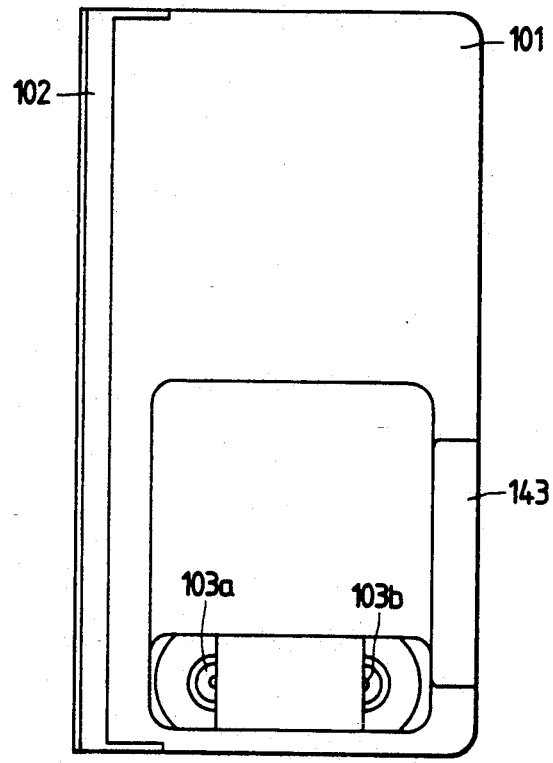
FIG. 29 is a lefthand side elevational view of the device shown in FIG. 25.
Figure 28:
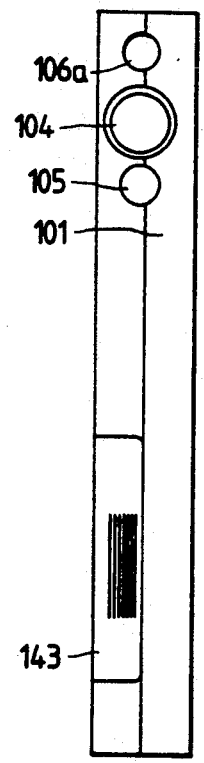
FIG. 28 is a front elevational view of the device shown in FIG. 25.

As shown in FIGS. 28 through 30, the lid 102 which covers a portion of the outer casing 101 is pivotally supported on the outer case 101 so as to be angularly openable and closable about at least one pivot on the outer case 101. The outer case 101 and the lid 102 are of the same size and shape as those of a tape cassette which is of existing predetermined dimensions. An objective lens 104 for introducing an image of the object is mounted on a side of the outer case 101. A microphone 105 for picking up sounds is disposed below the objective lens 104. The viewfinder 131 includes an objective window 106a for introducing light into the viewfinder 131. The battery storage housing 144 is covered with a housing lid 143 which is part of the outer case 101 and is detachably mounted on the outer case 101.

Figure 32:
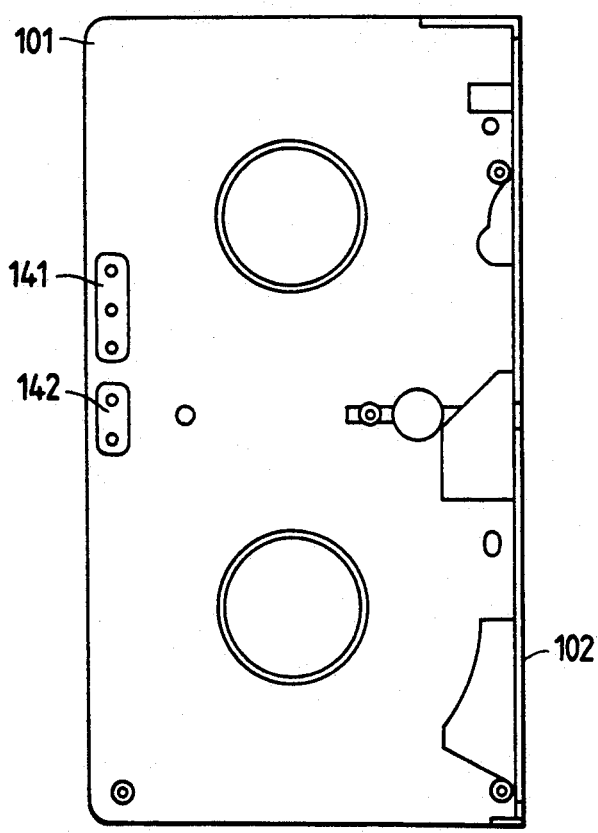
FIG. 32 is a righthand side elevational view of the device shown in FIG. 25.
Figure 31:
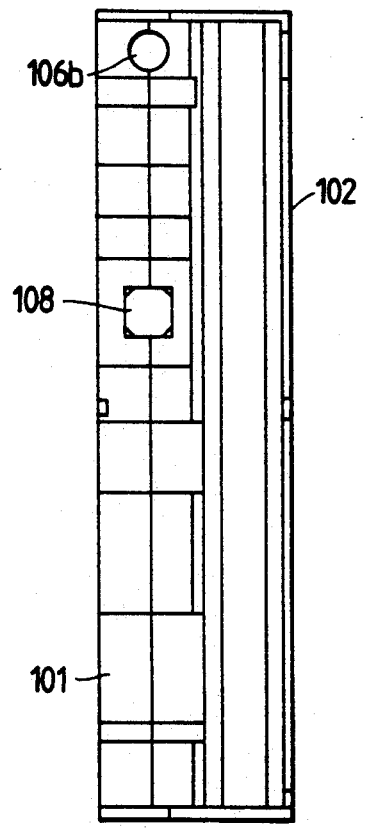
FIG. 31 is a rear elevational view of the device shown in FIG. 25 with a lid being open.

As shown in FIGS. 31 and 32, the viewfinder 131 also has an eyepiece window 106b (see FIG. 6 also) for the user to look into. A recording start button 108 for starting and stopping a recording process is disposed on the side of the outer case 101 which is covered by the lid 102. The outer case 101 supports an output signal terminal assembly 141 serving as connecting means for supplying video and audio output signals reproduced from the recorded magnetic tape 109 to an external apparatus such as a stationary VTR. The outer case 101 also supports a power supply terminal assembly 142 serving as connecting means for receiving electric power from an external apparatus such as a stationary VTR having its own power supply when the device is directly loaded in the VTR.

Figure 33:
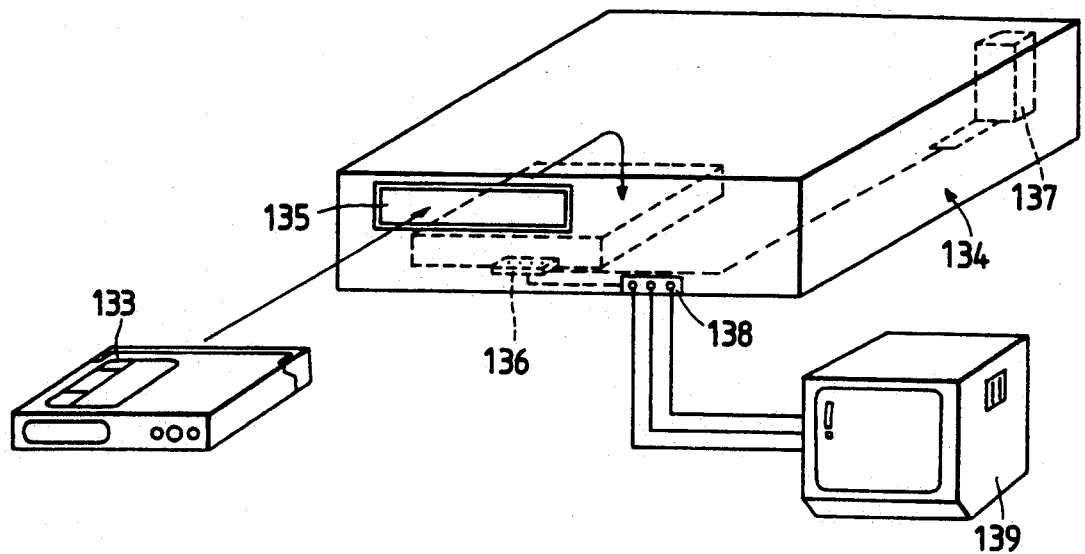
FIG. 33 is a perspective view showing the manner in which the video recording and playback device of the second embodiment is used for reproducing recorded images.

FIG. 33 shows how the device of the second embodiment is used to reproduce recorded images. In FIG. 33, the device of the second embodiment is indicated at 133, and the magnetic tape apparatus or stationary VTR is indicated at 134. Tape cassettes of predetermined dimensions which are of the same size and shape as the device 133 can be loaded directly into the stationary VTR 134. The stationary VTR 134 has a cassette insertion slot 135, a connector terminal assembly 136 for connection to the connecting means of the device 133, a power supply 137, and an output terminal assembly 138. A display unit 139 such as a TV is connected to the stationary VTR 134 through the output terminal assembly 138 through a cable for reproducing video and audio output signals from the device 133. The power supply 137 and the output terminal assembly 138 are electrically connected to the connector terminal assembly 136.

Figure 34:
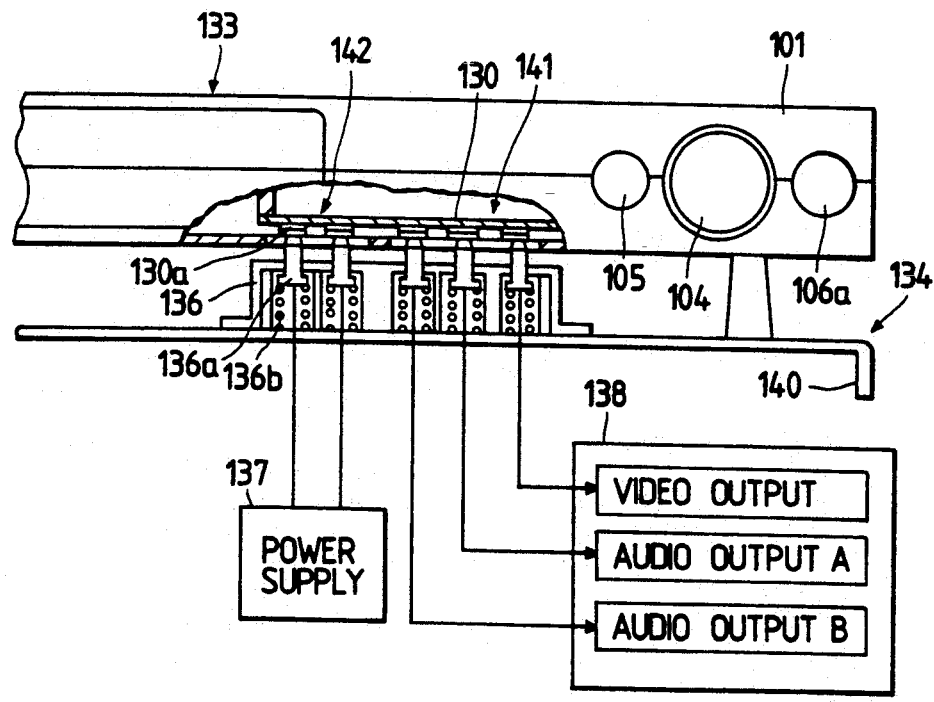
FIG. 34 is a view showing the manner in which output signal terminals and power supply terminals are connected to an external apparatus when the device of the second embodiment is loaded in the external apparatus.

FIG. 34 shows the output signal terminal assembly 141 and the power supply terminal assembly 142 which are connected to the stationary VTR 134. The terminal assemblies 141, 142 have five conductors 130a on the baseboard of the video/audio/power receiving circuit 130 in the device 133. The conductors 130a have surfaces disposed inwardly of the outermost surface of the outer case 101. The connector terminal assembly 136 includes five terminals 136a connected to the power supply 137 and the output terminal assembly 138, and five springs 136b for resiliently pressing the terminals 136a against the conductors 130a to keep them electrically conductive. The connector terminal assembly 136 is supported on a mechanical chassis of the stationary VTR 134.

Two out of the five conductors 130a and corresponding two out of the five terminals 136a serve to receive electric power from the power supply 137 in the stationary VTR 134, whereas the remaining three conductors 130a and three terminals 136a serve to send a video output signal and two audio output signals from the device 133 to the stationary VTR 134.

Operation of the device 133 will now be described with reference to FIGS. 25 through 34.

To record an image of an object, the battery 107 is mounted in the outer case 101, and the lid 102 is opened. Then, the user holds the device 133 by gripping the lid 102, and sees the object through the viewfinder 106, and then presses the recording start button 108. At this time, the magnetic tape 109 has already been loaded in the device 133 as shown in FIG. 25, extending from the supply reel 103a around the magnetic head drum 110 and the guide posts 112 through 118, 121 to the takeup reel 103b. When the recording start button 108 is pushed, the magnetic tape 109 is fed in the direction indicated by the arrow T in FIG. 25 at a predetermined speed, while recording the image.

The rotative power from the capstan motor 111 is transmitted through the drive belt 123 to the idler pulley 124 which turns the idler arm 125 into the solid-line position (FIG. 25) for thereby bringing the idler roller 126 into rolling contact with the takeup reel 103b. In this manner, the magnetic tape 109 is wound around the takeup reel 103b which is thus rotated. When the capstan motor 111 is reversed, the idler arm 125 is turned into the brokenline position for rotating the supply reel 103a backwards to cause itself to wind the magnetic tape 109. After the image has been recorded on the magnetic tape 109 and the magnetic tape 109 is fully fed until its terminal end is reached, the magnetic tape 109 automatically starts to be rewound onto the supply reel 103a by the reversal of the capstan motor 111. The magnetic tape 109 is stopped in its rewinding process when it is wound back to its starting end.

The recorded image is reproduced as follows: As described above, the device 133 is of the same size and shape as those of tape cassettes of the existing dimensions. When the recorded magnetic tape 109 is to be played back, the device 133 is inserted into the stationary VTR 134 through the cassette insertion slot 135. After the device 133 has fully been loaded into the stationary VTR 134, the conductors 130a of the terminal assemblies 141, 142 of the device 133 are brought into electric contact with the terminals 136a of the terminal assembly 136 of the stationary VTR 134, so that electric power for energizing the device 133 is automatically supplied from the power supply 137 in the stationary VTR 134. A playback start signal is produced to start moving the magnetic tape 109 in the device 133 in the same manner as described above. Video and audio output signals reproduced from the magnetic tape 109 ar then sent from the device 33 through the stationary VTR 134 and the output terminal assembly 138 to the display unit 139, which now displays the recorded image. In order to stop the playback mode or remove the device 133 from the stationary VTR 134, an eject button (not shown) of the stationary VTR 134 is pushed.

In the above second embodiment, the reproduced video and audio output signals are sent to the stationary VTR 134 and the display unit 139 connected to the stationary VTR 134. However, the video and audio output signals may be sent to another display unit such as a liquid crystal display unit which is mounted directly on the outer case 101 and electrically connected to the terminal assembly 141 of the device 133, so that the recorded image can be displayed on the display unit.

Figure 35:
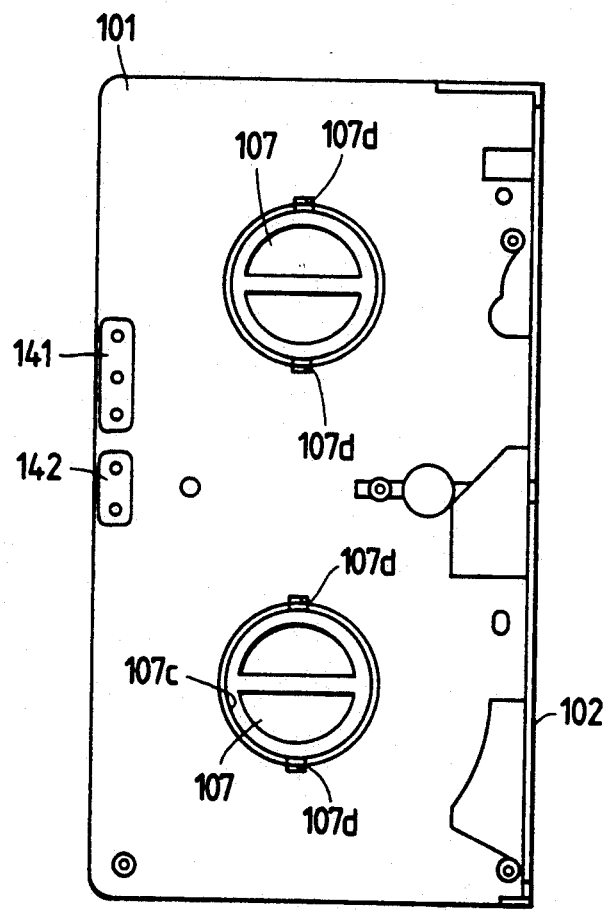
FIG. 35 is a righthand side elevational view of a video recording and playback device with a built-in video camera according to a third embodiment of the present invention.
Figure 36:
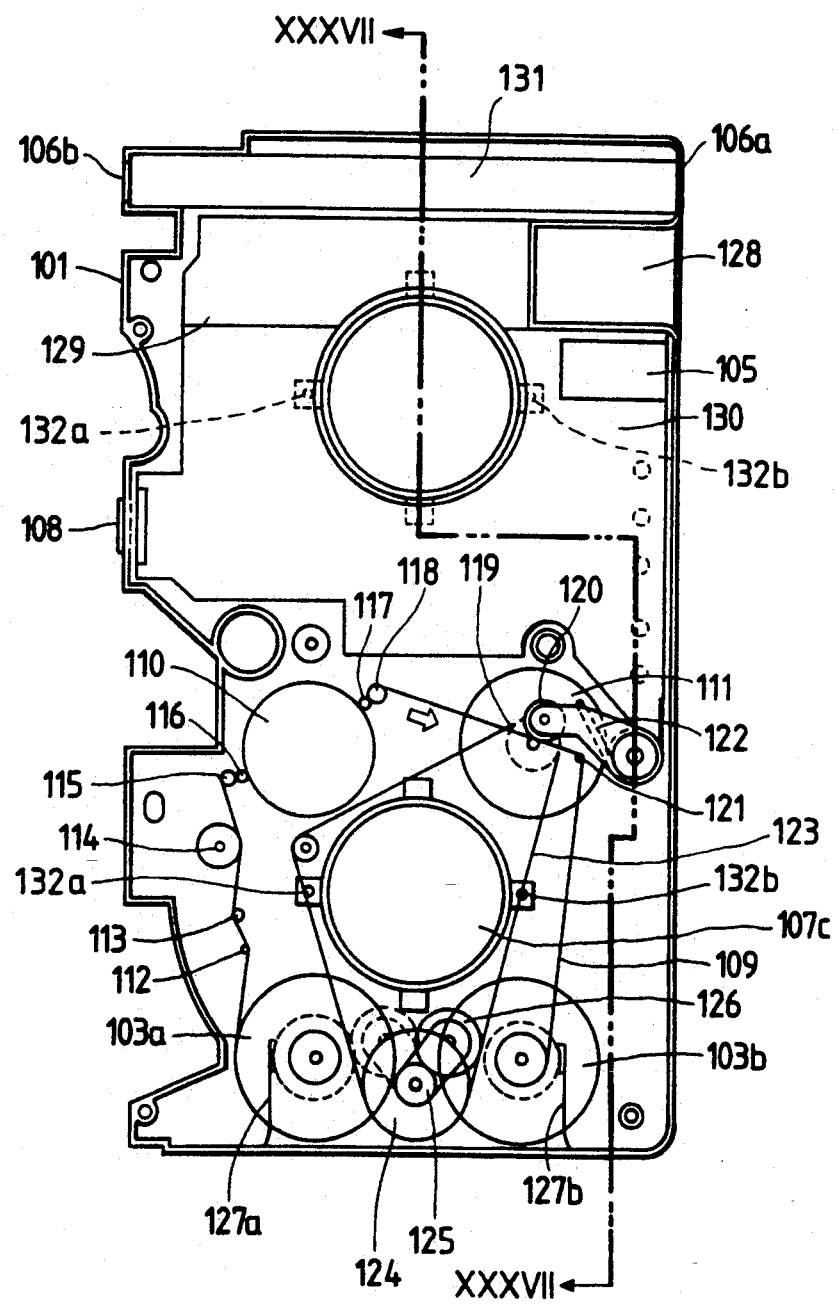
FIG. 36 is a lefthand side elevational view of the device shown in FIG. 35, with major components thereof being shown.
Figure 37:
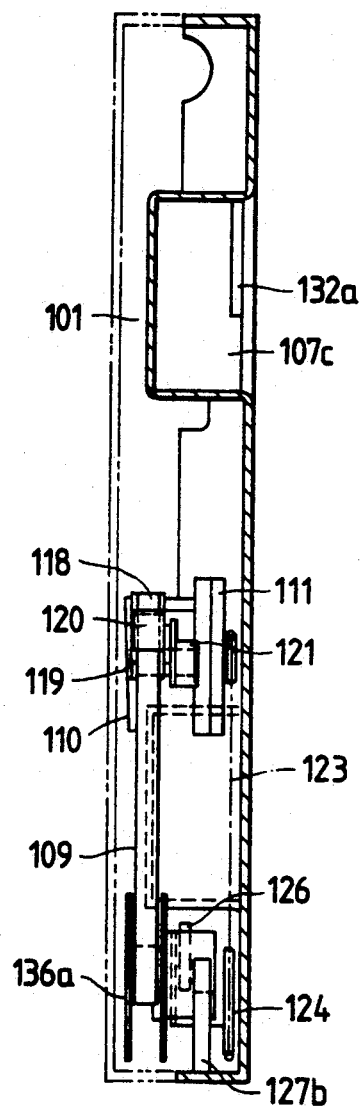
FIG. 37 is a cross-sectional view taken along line XXXVII—XXXVII of FIG. 36.

A video recording and playback device with a built-in video camera according to a third embodiment of the present invention will be described below with reference to FIGS. 35 through 41. The video recording and playback device of the third embodiment includes an outer case 101 having a pair of cassette reel base receiving holes 107c spaced from each other. Batteries 107 are received respectively in the holes 107c, as shown in FIG. 35. Therefore, the cassette reel base receiving holes 107c double as battery storage housings. Each of the holes 107c has a pair of diametrically opposite guide grooves 107d defined in its circumferential surface for guiding the battery 107 when it is loaded. As shown in FIGS. 36 and 37, a power receiving means includes a pair of positive and negative power receiving terminals 132a, 132b defined in the circumferential surface of each of the holes 107c. The power receiving terminals 132a, 132b are angularly spaced from the guide grooves 107d by 90°. When a battery 107 is properly placed in each of the holes 107c, electric power from the battery 107 is supplied through the terminals 132a, 132b.

Figure 38A:
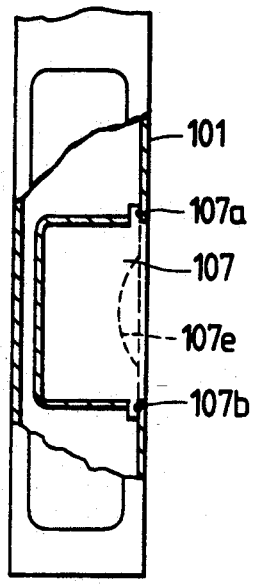
FIGS. 38(a) and 38(b) are views showing the device of FIG. 35 right after a battery is mounted therein, FIG. 38(a) being a partly cross-sectional view taken along line XXXVIII(a)—XXXVIII(a) of FIG. 38(b)
Figure 38B:
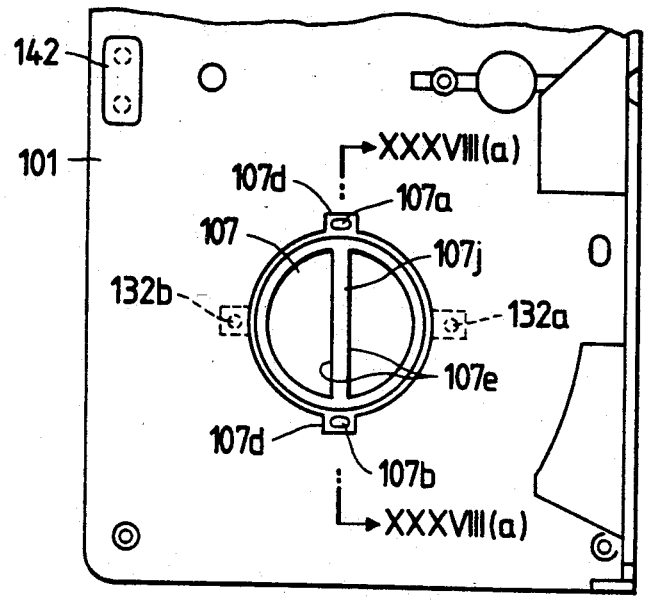
Figure 39A:
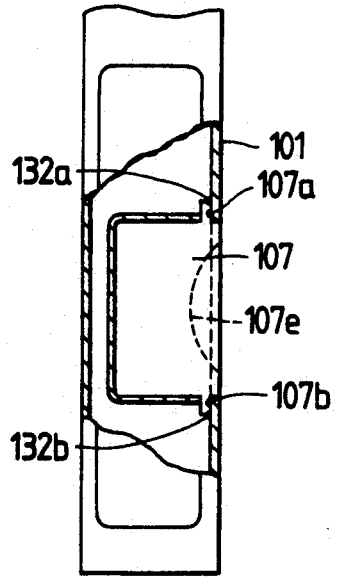
FIGS. 39(a) and 39(b) are views showing the device of FIG. 35 with the battery fully mounted, FIG. 39(a) being a partly cross-sectional view taken alone line XXXIX(a)—XXXIX(a) of FIG. 39(b)
Figure 39B:
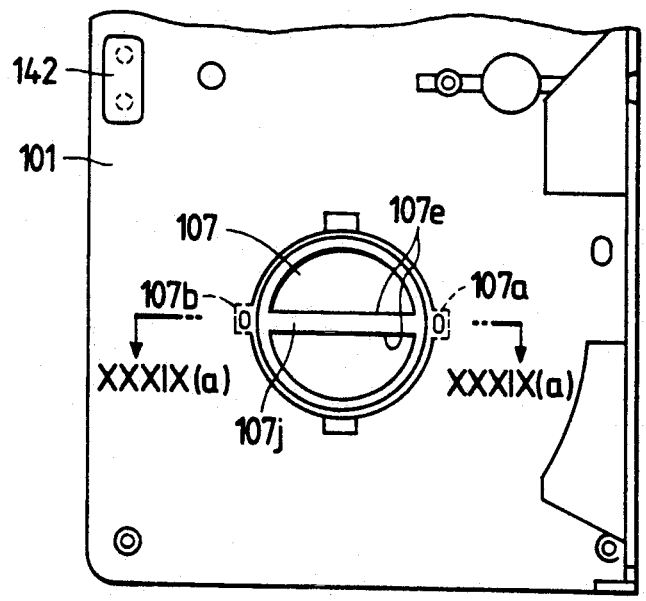

FIGS. 38(a) and 38(b) show the condition right after a battery 107 is loaded in one of the cassette reel base receiving holes 107c. The battery 107 has a pair of diametrically opposite positive and negative power supply terminals 107a, 107b projecting radially outwardly from the outer circumferential surface thereof In the position of FIG. 38, the power supply terminals 107a, 107b are positioned in the guide grooves 107d, respectively, and are not held in electric contact with the power receiving terminals 132a, 132b, respectively The battery 107 has a pair of semicircular recesses 107e defined in a surface thereof, leaving a diametrically extending grip 107j therebetween. The user then holds the grip 107j with fingers, and turns the battery 107 clockwise (FIG. 38(b)) into the angular position shown in FIGS. 39(a) and 39(b). Now, the two power supply terminals 107a, 107b of the battery 107 are brought into electric contact with the two power receiving terminals 132a, 132b, respectively, in the outer case 101, so that electric power from the battery 107 can be supplied to the video recording and playback device. The battery 107 can be removed by reversing the above battery loading process. Another battery 107 can be loaded into and removed from the other cassette reel base receiving hole 107c.

The other structural details of the device according to the third embodiment are the same as those of the device according to the second embodiment.

Figure 40:
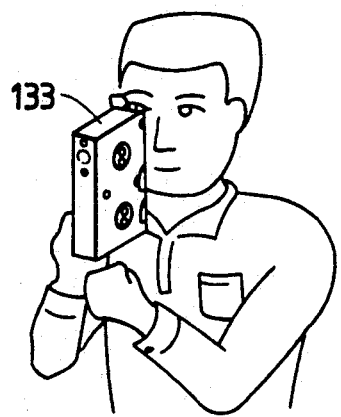
FIG. 40 is a perspective view showing the manner in which the device of the third embodiment is used to record images.
Figure 41:
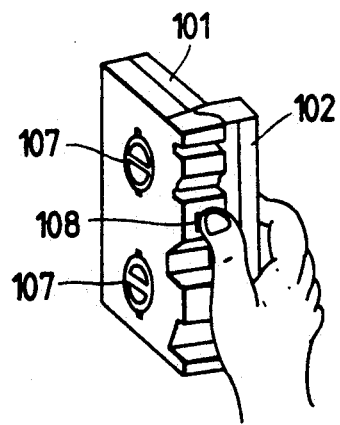
FIG. 41 is a perspective view showing the manner in which the device of the third embodiment is gripped.

To record an image of an object, at least one battery 107, or two batteries 107 usually, are placed into the respective holes 107c and angularly moved for electric connection, and then the lid is opened. Then, the lid 102 (FIG. 41) is gripped, and the device 133 is held as shown in FIG. 40 to see the object through the viewfinder.

FIGS. 42 through 45 illustrate a video recording and playback device with a built-in video camera according to a fourth embodiment of the present invention. The device of the fourth embodiment is essentially of the same construction as that of the device of the second embodiment except as follows: In the fourth embodiment, a battery 107 is mounted on a bottom 101b of an outer casing 101 as it is positioned when recording images. The battery 107 has a base 107f which is wider than its opposite side coupled to the bottom 101b of the outer case 101.

Figure 44:
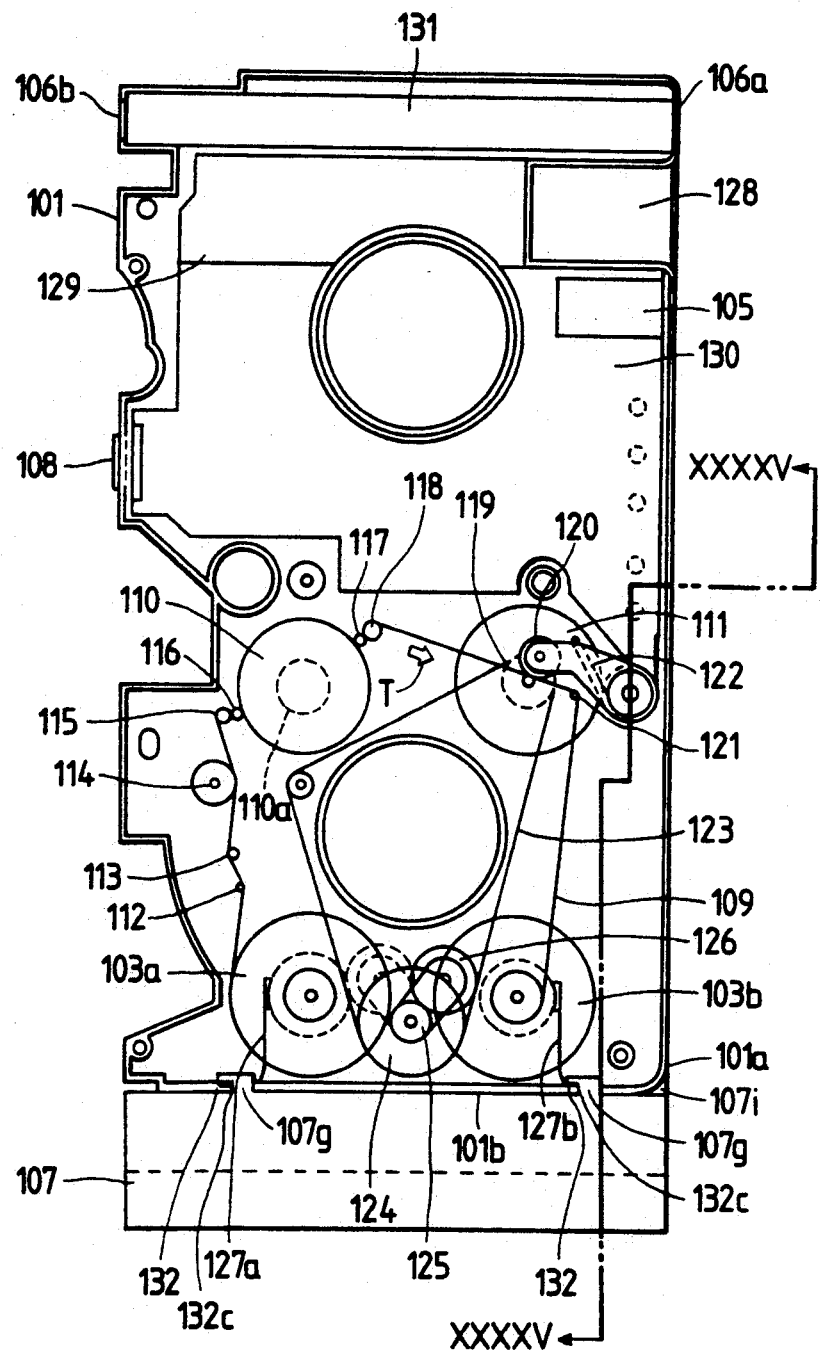
FIG. 44 is a lefthand side elevational view of the device shown in FIG. 42, showing major components thereof.
Figure 45:
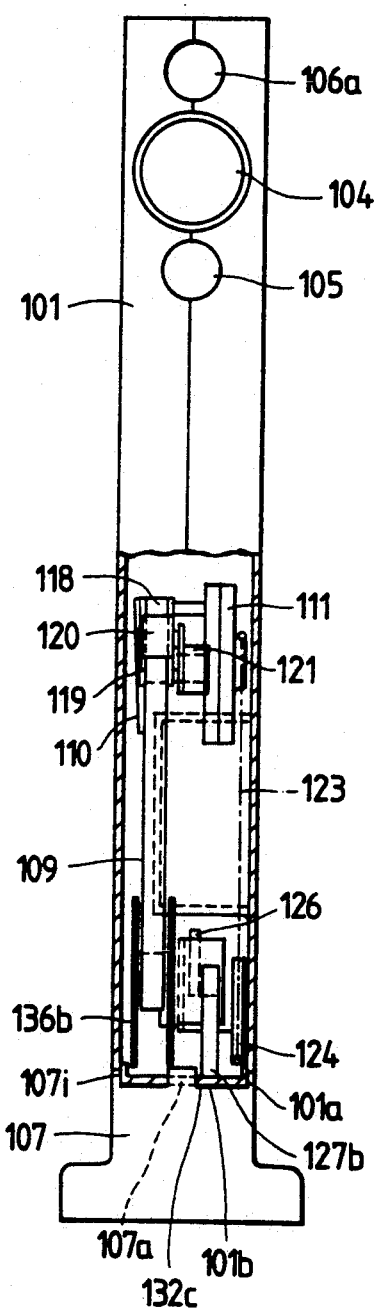
FIG. 45 is a front elevational view of the device shown in FIG. 42, partly in cross section taken along line XXXXV—XXXXV of FIG. 44.

In FIG. 44, the battery 107 has a pair of hooks 107g for hooking engagement with the outer case 101. As shown in FIGS. 44 and 45, the bottom 101b of the outer case 101 has two power receiving terminals 132 and two holes 132c defined therein adjacent to the terminals 132, respectively. The battery 107 has positive and negative terminals extending to those surfaces of the hooks 107g which will contact the power-receiving terminals 132.

For recording an image of an object, the hooks 107g of the battery 107 are inserted respectively into the holes 132c and then slid to the left (FIG. 44) into contact with the respective terminals 132 until the hooks 107g are stopped. The positive and negative terminals of the battery 107 are now electrically connected to the power receiving terminals 132. As shown in FIGS. 43 through 45, the outer case 101 has guide rails 101a on its bottom 101b and the battery 107 has guide grooves 107i in its coupling side. When the battery 107 is connected to the outer case 101, the guide rails 101a slide in and along the guide grooves 107i to allow the hooks 107a to be positioned and slid easily into the holes 132c. The battery 107 can be detached from the outer case 101 by reversing the above battery mounting process. After the battery 107 has been mounted on the bottom 107 of the outer case 101, the lid 102 is opened to make the device ready for recording images.

In the fourth embodiment, at least one set of the reels 103a, 103b, at least one set of the viewfinder windows 106a, 106b, and at least one recording start button 108 are sufficient for use on the device. The outer case 101 may be identical or substantially identical in shape to existing tape cassettes.

A video recording and playback device with a built-in video camera according to a fifth embodiment of the present invention will be described below with reference to FIG. 46. The video recording and playback device has an outer case having the same shape and dimensions as those of a tape cassette that can be inserted into an existing magnetic tape apparatus having a playback function, such as a stationary VTR. Therefore, the outer case can be inserted into the magnetic tape apparatus. The outer case accommodates therein and supports thereon a recording medium, an imaging unit for generating a video signal indicating an image of an object, a microphone, a signal recording means for processing signals from the imaging unit and the microphone to record video and audio signals on the recording medium, and a power receiving means for receiving electric power from an external power supply to energize the signal recording means and other components.

The recording medium comprises a magnetic sheet disk which is rotated and held by a rotating/holding means. The signal recording means comprises an electric circuit including a recording/reproducing pickup means such as a magnetic head, for example, which can contact the magnetic sheet disk, and video and audio signal recording/reproducing means which may be the same as those of the first embodiment. The video recording and playback device of the fifth embodiment is thus equivalent to a so-called electronic still camera (which employs "still video floppy disk system" according to the technical standards CPZ-250 of the Electronic Industries Association of Japan). Images recorded by the device according to the fifth embodiment can be reproduced simply by loading the device into the stationary VTR, without having to employ an image reproducer designed exclusively for use with an electronic still camera.

Figure 46:
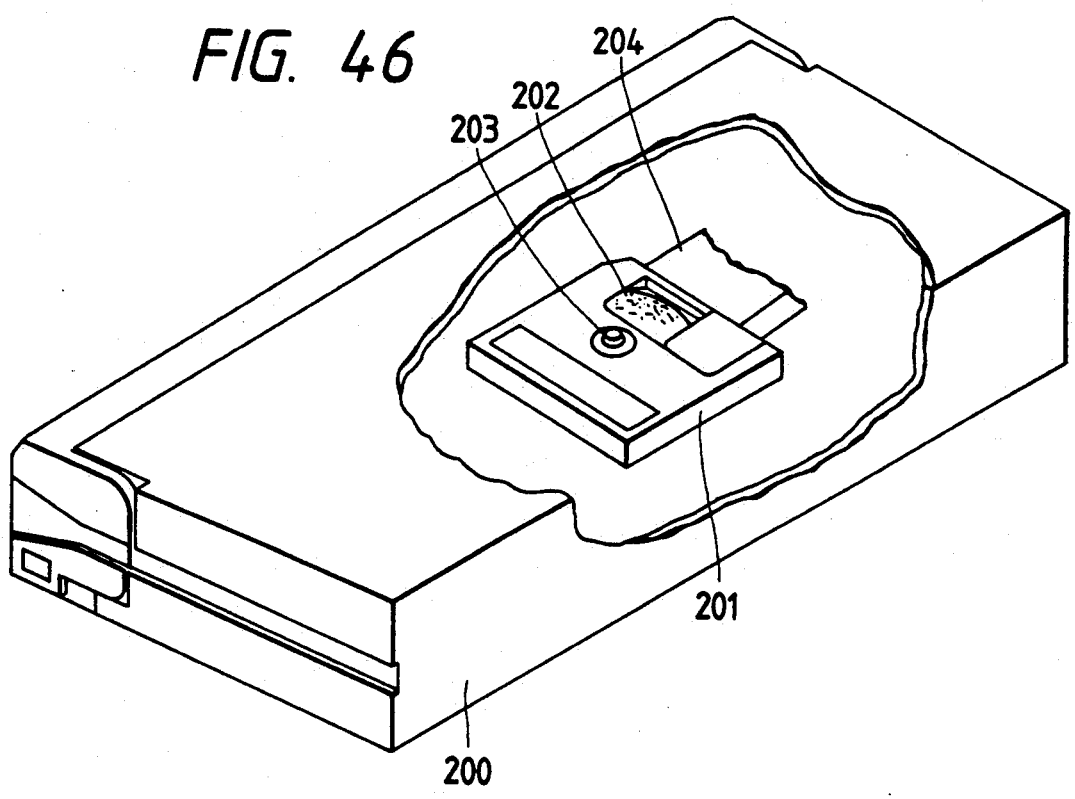
FIG. 46 is a perspective view, partly broken away, of a video recording and playback device with a built-in video camera according to a fifth embodiment of the present invention.

In FIG. 46, the above outer case, which is denoted at 200, houses a still video floppy disk case 201 accommodating therein a magnetic sheet disk 202 serving as the recording medium. The magnetic sheet disk 202 can be rotated by a spindle 203 rotatable by a motor (not shown). The recording/reproducing pickup means, denoted at 204, is disposed near the magnetic sheet disk 202 and has a ring head, for example, for detecting signals recorded on the magnetic sheet disk 202. By thus employing the still video floppy disk system according to the technical standards CPZ-250 of the Electronic Industries Association of Japan as a recording medium, image data recorded by the device of the fifth embodiment of the present invention can be accessed and selected very quickly.

A video recording and playback device with a built-in video camera according to a sixth embodiment of the present invention will be described below with reference to FIG. 47. The video recording and playback device of the sixth embodiment differs from the device of the fifth embodiment in that it employs, as a recording medium, an optical disk for recording images by way of refraction, polarization, or the like of light, and video and audio signals are recorded on the optical disk by a signal recording means and reproduced from the optical disk by a signal reproducing means. According to the sixth embodiment, as with the fifth embodiment, recorded images can be reproduced simply by loading the device into an existing stationary VTR, without having to employ an image reproducer designed exclusively for use with an optical disk.

In FIG. 47, an outer case 210 has the same shape and dimensions as those of a tape cassette that can be inserted into an existing magnetic tape apparatus having a playback function, such as a stationary VTR. An optical disk 211 rotatably disposed in the outer case 210 comprises optically transparent and reflective members superposed one on the other. The optical disk 211 is rotated by a spindle 212 coupled to a motor. The outer case 210 also houses therein the signal recording/reproducing means or pickup means, denoted at 213, which include a light-emitting means for applying a light beam to the optical disk 211 and a read-out means for converting the intensity or refracted or polarized condition of a light signal reflected from the optical disk 211 to an electric signal. With the optical disk 211 used as a recording means, recorded data thereon can be accessed and selected very quickly, and the recording density on the optical disk 211 can be greatly increased by shortening the wavelength of the light beam applied to the optical disk 211. Stated otherwise, the device of the sixth embodiment can record and reproduce highly accurate image data containing a large amount of information, i.e., a large amount of high-quality image data. Since image signals can be recorded on and reproduced from the optical disk without physical contact between the pickup means and the optical disk, the recorded data will not be deteriorated by repeated reproduction thereof.

According to a seventh embodiment, a video recording and playback device with a built-in video camera employs another recording medium made of a PHB (Photochemical Hole Burning) material. When molecules of such a PHB material, or a guest material capable of a chemical reaction, are mixed with those of a host material, the properties of the PHB material change such that each of the molecules becomes unable to absorb light of a certain wavelength. Theoretically, each molecule can store information depending on whether it absorbs light or not. The video recording and playback device of the seventh embodiment can produce reproduced images simply by being inserted into an existing stationary VTR without having to employ a dedicated image reproducer.

The video reproducing and playback devices of the present invention offer a wide variety of advantages.

According to the first embodiment as shown in FIGS. 1 through 22, since the magnetic tape is disposed in the outer case, no separate tape cassette is required and loaded at the time of recording images, and images can immediately and simply be recorded on the magnetic tape. To reproduce recorded images, the device itself is loaded into the existing magnetic tape apparatus. It is not necessary to connect the device to the display unit, or to remove any tape cassette from the device, but the recorded images can be reproduced simply by loading the device into the magnetic tape apparatus. Therefore, the complexities of operation can be eliminated when recording images in the device and reproducing images from the device.

Moreover, the outer case is free of large surface irregularities such as convexities and concavities, and is typically in the form of a rectangular parallelepiped. The device can thus be easily and safely carried in an ordinary bag, and a special storage bag for the device does not need to be used. Images can be recorded on and reproduced from the magnetic tape in the device in any format which may be or may not be one of the existing formats. Therefore, the internal structure and circuit of the device may be designed with great freedom. The device may be so small in size and light in weight that it can be equivalent to existing tape cassettes of predetermined dimensions. The device is therefore quite advantageous in that it is portable and takes up a small storage space.

According to the first embodiment as shown in FIGS. 6, 7, and 8, since the viewfinder windows are disposed on the outer case, no separate viewfinder is required to be mounted on the outer case. The user can easily record images while seeing the object through the viewfinder windows.

According to the first embodiment as shown in FIG. 6, the battery is detachably mounted on the outer case and connected to the power receiving connector terminals of the power receiving circuit in the device. The device can be operated more easily than if the battery and the power-receiving circuit were connected by a cable. The outer case can easily be loaded into the magnetic tape apparatus simply detaching the battery from the outer case.

According to the first embodiment as shown in FIG. 6, the reels are detachably mounted in the outer case so that the reels with a magnetic tape wound therearound can be removed from the outer case. Consequently, a recorded magnetic tape can be stored for future use and it can be placed in a small storage space. The running cost of magnetic tapes is much lower than is possible with undetachable reels.

According to the first embodiment as shown in FIG. 20, the lid pivotally attached to the outer case doubles as a grip when the device is used to record images. When recording images, the lid is opened and used as a grip. Thus, images can be recorded by the device with ease. When carrying the device, the lid is closed, and the device can easily be put into an ordinary bag or the like. Conventional devices have a grip containing a battery and a viewfinder which project outwardly from an outer case. Therefore, these conventional devices cannot easily be put into ordinary bags or or the like, and may be damaged or not well protected if forced into the bags.

According to the first embodiment as shown in FIG. 11, the eyepiece window of the viewfinder and the button for operating the device are disposed on the outer case behind the lid as it is closed. Therefore, the eyepiece window and the button are protected from damage, and the lid doubles as a dust cover when closed.

According to the first embodiment as shown in FIGS. 14(a), 14(b) and 15(a), 15(b), the device has a power supply switch which can be turned on and off in response to opening and closing movement of the lid pivotally mounted on the outer case. Since the power supply switch is not required to be manually operated at the time of starting to record images, any push button and any indicator lamp which would otherwise be associated with the power supply switch are not necessary. While the device is being stored in a bag and carried around for a long period of time during outdoor use, it is almost unlikely for the power supply switch to be left turned on because the user can confirm whether the lid is closed or not at a glance when he places the device into the bag. As a consequence, the user does need to be careful about the turning off of the power supply switch. Heretofore, it has been necessary to manually turn on the power supply switch and to load a suitable tape cassette in the device in advance when recording images, and also to exercise care not to forget to turn off the power supply switch to save electric power when placing the device in a bag and carrying it around. It has been highly likely for the user to forget to turn off the power supply switch due to an oversight for the reason that the power supply switch is difficult to distinguish from other switches.

According to the first embodiment as shown in FIGS. 17(a), 17(b) and 18(a), 18(b), the device has a holder means for holding the lid open. There is no danger for the lid to be closed in error during operation of the device. The user can record images with ease since he is not required to be careful about the accidental closing of the lid.

According to the first embodiment as shown in FIG. 6, the device has a signal reproducing means for reproducing signals recorded on the magnetic tape. Thus, the recorded signals can be reproduced by the device itself without employing a separate signal reproducer.

According to the first embodiment as shown in FIGS. 12 and 22, the outer case of the device has connector means for sending monitor signals including video signals from the imaging unit or reproduced output signals from the signal reproducing means to the external magnetic tape apparatus. Accordingly, recorded images can be monitored or reproduced with ease.

According to the first embodiment as shown in FIGS. 23 and 24, the display unit connected to the connector means is mounted on the outer case, so that reproduced images can be displayed on the display unit without having to load the device into the magnetic tape apparatus.

According to the first embodiment as shown in FIGS. 6, 7, 8, 12, 21, and 22, the magnetic tape apparatus comprises a video tape recorder, and the outer case supports a microphone. The signal recording means can record an audio signal from the microphone, and the signal reproducing means can reproduce the audio signal. The power receiving means has a connector terminal assembly for connection to a battery detachably mounted on the outer case and another connector terminal assembly for connection to the power supply means in the video tape recorder. The connector means sends signals to the video tape recorder. The device can record images with ease, and reproduce recorded images simply by being loaded into the video tape recorder, typically a stationary video tape recorder, of existing dimensions while removing the battery from the outer case.

According to the first embodiment as shown in FIG. 21, the video tape recorder comprises a stationary video tape recorder and has a cassette holder for placing thereon and loading the outer case into the video tape recorder. Therefore, the device can easily be loaded into and unloaded from the video tape recorder.

According to the fifth and sixth embodiments as shown in FIGS. 46 and 47, the recording medium for recording images is disposed in the outer case. Recorded images can be reproduced simply by loading the device into a magnetic tape apparatus such as an existing stationary video tape recorder without employing an image reproducer dedicated for such recording mediums as floppy disks used in electronic still cameras or optical disks.

According to the second, third, and fourth embodiments as shown in FIGS. 25 through 45, since the magnetic tape is disposed in the outer case, no separate tape cassette is required to be loaded at the time of recording images, and images can immediately and simply be recorded on the magnetic tape. To reproduce recorded images, the device itself is loaded into the existing magnetic tape apparatus. It is not necessary to connect the device to the display unit, or to remove any tape cassette from the device, but the recorded images can be reproduced simply by loading the device into the magnetic tape apparatus. Therefore, the complexities of operation can be eliminated when recording images in the device and reproducing images from the device.

Moreover, the outer case is free of large surface irregularities such as convexities and concavities, and is typically in the form of a rectangular parallelepiped. The device can thus be easily and safely carried in an ordinary bag, and a special storage bag for the device does not need to be used. Images can be recorded on and reproduced from the magnetic tape in the device in any format which may be or may not be one of the existing formats. Therefore, the internal structure and circuit of the device may be designed with great freedom. The device may be so small in size and light in weight that it can be equivalent to existing tape cassettes of predetermined dimensions. The device is therefore quite advantageous in that it is portable and takes up a small storage space.

Since the battery is attachable and detachable, the device can record images quite easily. The device can easily be loaded into the magnetic tape apparatus simply by removing the battery.

According to the second embodiment as shown in FIGS. 25 and 26, since the battery is housed in the outer case, it is not necessary to remove the battery when the device is loaded into the magnetic tape apparatus. Inasmuch as the battery does not project outwardly, the device can conveniently be carried around and no large storage space is needed for the battery.

According to the second embodiment as shown in FIG. 34, because the power receiving means is electrically connectable to the power supply means in the magnetic tape apparatus or the display unit, the device can easily be powered when reproducing recorded images.

According to the third embodiment as shown in FIGS. 35 through 41, the outer case has a pair of cassette reel base receiving holes, and batteries are detachably disposed in the respective cassette reel base receiving holes. At least one of the batteries may be used as a spare battery. When one of the batteries is used up while images are being recorded, it is automatically switched to the other spare battery without having to replace it, so that the images can continuously be recorded. The batteries placed in the cassette reel base receiving holes do not project out, the device can conveniently be carried around and no large storage is needed for the batteries.

According to the fourth embodiment as shown in FIGS. 42 through 45, the battery is mounted on the bottom of the outer case when the device is used to record images. Since the battery is positioned on the lower side of the outer case, the device is stabilized by the weight of the battery while being held to record images. In addition, the outer shape of the battery can be designed with greater freedom. Conventionally, since the battery doubles as a grip, it cannot be detached, and cannot freely be shaped into any desired shape.

According to the fourth embodiment as shown in FIGS. 42 through 45, the battery has a remote side which is wider than its opposite side coupled to the bottom of the outer case. Accordingly, the battery has a lower center of gravity, allowing the device to be stably placed on a desk, a floor, or the like. Since the battery doubles as a stand for the device, therefore, the device can be handled with greater ease when recording and reproducing images.

Although certain preferred embodiments have been shown and described, it should be understood that many changes and modifications may be made therein without departing from the scope of the appended claims.

What is claimed is:

1. A video recording and playback device with a built-in video camera comprising:
   an outer case having the same outer profile and outer dimensions as those of an existing magnetic tape cassette, whereby said outer case is insertable into an existing magnetic tape apparatus having a playback function;
   said device having a first connector and the existing magnetic tape apparatus having a second connector for connection with said first connector,
   whereby said video recording and playback device is independently operable and is insertable into the existing magnetic tape apparatus to be operable therewith;
   a pair of reels rotatably disposed in said outer case;
   a magnetic tape wound around said reels;
   a magnetic head drum in said outer case for recording signals on said magnetic tape;
   a motor in said outer case for rotating said magnetic head drum;
   magnetic tape guide means in said outer case for guiding said magnetic tape to run on and around said magnetic head drum;
   magnetic tape transport means in said outer case for transporting said magnetic tape from one of said reels to the other reel;
   an imaging unit in said outer case for producing a video signal representative of an image of an object;
   signal recording means in said outer case for processing the video signal from said imaging unit and enabling said magnetic head drum to record the video signal on said magnetic tape; and
   power receiving means on said case for receiving electric power to energize said motor, said magnetic tape transport means, said imaging unit, and said signal recording means.

2. A video recording and playback device with a built-in video camera according to claim 1, further including a viewfinder having at least one window for passing light from the object therethrough, said window being disposed on said outer case.

3. A video recording and playback device with a built-in video camera according to claim 1, further including a battery detachably mounted on said outer case, said power receiving means including a connector terminal assembly connected to said battery.

4. A video recording and playback device with a built-in video camera according to claim 1, wherein said reels are detachably mounted in said outer case.

5. A video recording and playback device with a built-in video camera according to claim 1, wherein said outer case ha a lid which is openable and closable and can be used as a grip when opened.

6. A video recording and playback device with a built-in video camera according to claim 5, further including a viewfinder having at least one window for passing light from the object therethrough, and a button for operating said device, said window and said button being mounted on said outer case behind said lid.

7. A video recording and playback device with a built-in video camera according to claim 1, wherein said outer case has a lid which is openable and closable, further including a power supply switch mounted on said outer case and operable to switch on and off the electric power in response to opening and closing movement of the lid.

8. A video recording and playback device with a built-in video camera according to claim 7, further including holder means on said outer case for holding said lid open.

9. A video recording and playback device with a built-in video camera according to claim 1, further including signal reproducing means in said outer case for reproducing a signal recorded on said magnetic tape.

10. A video recording and playback device with a built-in video camera according to claim 9, further including connector terminal means on said outer case for sending a monitor signal including said video signal from said imaging unit or a reproduced output signal from said signal reproducing means to the magnetic tape apparatus which is outside of said outer case.

11. A video recording and playback device with a built-in video camera according to claim 10, further including a display unit mounted on said outer case and connected to said connector terminal means.

12. A video recording and playback device with a built-in video camera according to claim 10, wherein said magnetic tape apparatus comprises a video tape recorder, further including a microphone on said outer case, said signal recording means comprising means for recording an audio signal from said microphone on said magnetic tape, said signal reproducing means comprising means for reproducing the audio signal from said magnetic tape, said power receiving means having a connector terminal assembly connected to said battery and a connector terminal assembly connectable to power supply means in said video tape recorder, said connector terminal means comprising means for sending the signal to said video tape recorder.

13. A video recording and playback device with a built-in video camera according to claim 12, wherein said video tape recorder comprises a stationary video tape recorder, said stationary video tape recorder having a cassette holder for placing said outer case thereon and loading the outer case into said video tape recorder.

14. A video recording and playback device with a built-in video camera comprising:
an outer case having the same outer profile and outer dimensions as those of an existing magnetic tape cassette, whereby said outer case is insertable into an existing magnetic tape apparatus having a playback function;
said device having a first connector and the existing magnetic tape apparatus having a second connector for connection with said first connector,
whereby said video recording and playback device is independently operable and is insertable into the existing magnetic tape apparatus to be operable therewith;
a recording medium disposed in said outer case;
an imaging unit in said outer case for producing a video signal representative of an image of an object;
a microphone disposed on said outer case;
signal recording means in said outer case for processing signals from said imaging unit and said microphone and recording video and audio signals on said recording medium; and
power receiving means on said case for receiving electric power to energize said imaging unit, said microphone, and said signal recording means.

15. A video recording and playback device with a built-in video camera according to claim 14, wherein said recording medium comprises a substantially disk-shaped medium having an optically transparent member and an optically reflective member which are superposed one on the other, said signal recording means including at least light-emitting means for applying light to said recording medium.

16. A video recording and playback device with a built-in video camera according to claim 14, wherein said recording medium comprises a substantially disk-shaped magnetic sheet, said signal recording means comprising means for converting an electric signal to a magnetic field.

17. A video recording and playback device with a built-in video camera according to claim 14, wherein said recording medium is made of a photochemical hole burning material.

18. A video recording and playback device with a built-in video camera comprising:
an outer case having the same outer profile and outer dimensions as those of an existing magnetic tape cassette, whereby said outer case is insertable into an existing magnetic tape apparatus having a playback function;
said device having a first connector and the existing magnetic tape apparatus having a second connector for connection with said first connector,
whereby said video recording and playback device is independently operable and is insertable into the existing magnetic tape apparatus to be operable therewith;
battery means detachably mounted on said outer case;
a pair of reels rotatably disposed in said outer case;
a magnetic tape wound around said reels;
a magnetic head drum in said outer case for recording signals on said magnetic tape;
a motor in said outer case for rotating said magnetic head drum;
magnetic tape guide means in said outer case for guiding said magnetic tape to run on and around said magnetic head drum;
magnetic tape transport means in said outer case for transporting said magnetic tape from one of said reels to the other reel;
an imaging unit in said outer case for producing a video signal representative of an image of an object;
signal recording means in said outer case for processing the video signal from said imaging unit and enabling said magnetic head drum to record the video signal on said magnetic tape; and
power receiving means on said case for receiving electric power to energize said motor, said magnetic tape transport means, said imaging unit, and said signal recording means, said power receiving means including at least a connector terminal assembly connected to said battery means.

19. A video recording and playback device with a built-in video camera according to claim 18, wherein said battery means is housed within said outer case.

20. A video recording and playback device with a built-in video camera according to claim 18, wherein said power receiving means is electrically connectable to the magnetic tape apparatus and a display unit.

21. A video recording and playback device with a built-in video camera according to claim 18, wherein said outer case has a pair of cassette reel base receiving holes defined therein, said battery means comprising a pair of batteries detachably disposed in said cassette reel base receiving holes, respectively.

22. A video recording and playback device with a built-in video camera according to claim 18, wherein said battery means comprises a battery mounted on a bottom of said outer case when images are recorded by said device.

23. A video recording and playback device with a built-in video camera according to claim 22, wherein said battery has a base remote from a side thereof coupled to the bottom of said outer case, said base being wider than said side of the battery.

24. A video recording and playback device with a built-in video camera comprising:
an outer case having the same outer profile and outer dimensions as those of an existing magnetic tape cassette, whereby said outer case is insertable into an existing magnetic tape apparatus having a playback function;
said device having a first connector and the existing magnetic tape apparatus having a second connector for connection with said first connector,
whereby said video recording and playback device is independently operable and is insertable into the existing magnetic tape apparatus to be operable therewith;
a pair of reels rotatably disposed in said outer case;
a magnetic tape wound around said reels;
a magnetic head drum in said outer case for recording signals on said magnetic tape;
a motor in said outer case for rotating said magnetic head drum;

an imaging unit in said outer case for producing a video signal representative of an image of an object;

signal recording means in said outer case for processing the video signal from said imaging unit and enabling said magnetic head drum to record the video signal on said magnetic tape; and power receiving means on said case for receiving electric power to energize said motor, said imaging unit, and said signal recording means.

25. A video recording and playback device with a built-in video camera comprising:

an outer case having the same outer profile and outer dimensions as those of an existing magnetic tape cassette, whereby said outer case is insertable into an existing magnetic tape apparatus having a playback function;

said device having a first connector and the existing magnetic tape apparatus having a second connector for connection with said first connector, whereby said video recording and playback device is independently operable and is insertable into the existing magnetic tape apparatus to be operable therewith;

battery means detachably mounted on said outer case;

a pair of reels rotatably disposed in said outer case;

a magnetic tape wound around said reels;

a magnetic head drum in said outer case for recording signals on said magnetic tape;

a motor in said outer case for rotating said magnetic head drum;

an imaging unit in said outer case for producing a video signal representative of an image of an object;

signal recording means in said outer case for processing the video signal from said imaging unit and enabling said magnetic head drum to record the video signal on said magnetic tape; and power receiving means on said case for receiving electric power to energize said motor, said imaging unit, and said signal recording means, said power receiving means including at least a connector terminal assembly connected to said battery means.

26. In a system for recording and reproducing data including a first reproducing apparatus having a slot for receiving a cassette of predetermined dimensions, the cassette having a recording medium therein, the first reproducing apparatus including at least a reproducing head for reproducing data from the recording medium, and an output means for outputting data reproduced from the recording medium, the improvement comprising:

a second reproducing apparatus, said second reproducing apparatus having dimensions substantially similar to the predetermined dimensions of the cassette and receivable in the slot of the first reproducing apparatus, said second reproducing apparatus including:

an included recording medium internal thereto, an included reproducing head for reproducing signals recorded on said included recording medium, and an output connector for providing signals reproduced by said included reproducing head to the output means of the first reproducing apparatus, wherein the first reproducing apparatus includes connector means for connection with said output connector of said second reproducing apparatus.

27. An improved system for recording and reproducing data in accordance with claim 26, wherein the first reproducing apparatus includes a stationary video tape recorder (VTR) and said second reproducing apparatus comprises a portable VTR insertable in the slot of the stationary VTR, said portable VTR having an outer casing with dimensions substantially identical to said predetermined dimensions.

28. An improved system for recording and reproducing data in accordance with claim 27, wherein said output connector is included in said portable VTR and said connector means comprises an internal connector in the stationary VTR for connection with said output connector of said portable VTR, said output connector including first terminals for receiving electrical power from a power supply of the stationary VTR and second terminals for providing said reproduced signals reproduced by said included reproducing head to the stationary VTR for output to a display means, whereby said portable VTR, once inserted in the slot of the stationary VTR, draws power from the stationary VTR for operating said included reproducing head to provide said reproduced signals to the stationary VTR.

29. An improved system for recording and reproducing data in accordance with claim 28 wherein said second reproducing apparatus further comprises:

an imaging system including a video camera for producing video signals representing an imaged object to be recorded on the included reproducing medium; and an included recording head for recording said video signals on said included recording medium.

30. An improved system for recording and reproducing data in accordance with claim 26 wherein said second reproducing apparatus further comprises:

an imaging system including a video camera for producing video signals representing an imaged object to be recorded on the included reproducing medium; and an included recording head for recording said video signals on said included recording medium.

31. An improved system for recording and reproducing data in accordance with claim 30, wherein the first reproducing means includes a medium transport means for providing relative displacement between the recording medium of a cassette received thereby and the reproducing head thereof, and said second reproducing apparatus further comprises:

an included transport means for providing relative displacement between the included recording medium therein and the included reproducing head thereof.

32. An improved system for recording and reproducing data in accordance with claim 26, wherein the first reproducing means includes a medium transport means for providing relative displacement between the recording medium of a cassette received thereby and the reproducing head thereof, and said second reproducing apparatus further comprises:

an included transport means for providing relative displacement between the included recording medium therein and the included reproducing head thereof.

33. A tape cassette apparatus for use in an existing video recording apparatus having a slot for receiving a cassette, a tape transport means for transporting tape in the cassette received in the slot, and a magnetic head for reading information from the tape, said cassette apparatus comprising:
an outer case,
an internal cassette head for recording and reproducing video information on and from a tape in the cassette apparatus,
an internal cassette transport mechanism for transporting tape within said cassette apparatus around said internal cassette head, and wherein
said cassette apparatus is dimensioned to be insertable into the slot of the existing video recording apparatus, said cassette apparatus having first connection means and said existing video recording apparatus having second connection means for transfer of data between said cassette apparatus and the existing video recording apparatus via said first and second connection means.

34. A tape cassette apparatus according to claim 33, further comprising a video camera mounted in said outer case for recording video images on the tape in said cassette apparatus.

35. A tape cassette apparatus according to claim 34 wherein said internal cassette transport mechanism comprises a transport motor in said outer case for transporting the tape within said cassette apparatus around said internal cassette head.

* * * * *